United States Patent
Shin et al.

(10) Patent No.: US 11,340,780 B2
(45) Date of Patent: May 24, 2022

(54) ELECTRONIC DEVICE AND METHOD FOR PERFORMING FUNCTION OF ELECTRONIC DEVICE

(71) Applicant: Samsung Electronics Co., Ltd., Gyeonggi-do (KR)

(72) Inventors: Sangmin Shin, Gyeonggi-do (KR); Donghoon Kang, Gyeonggi-do (KR); Jikwang Kang, Gyeonggi-do (KR); Kyuhong Kim, Gyeonggi-do (KR); Yeojeong Yoon, Gyeonggi-do (KR); Yusun Cheong, Gyeonggi-do (KR); Yeunwook Lim, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/257,601

(22) PCT Filed: Jul. 8, 2019

(86) PCT No.: PCT/KR2019/008340
§ 371 (c)(1),
(2) Date: Jan. 4, 2021

(87) PCT Pub. No.: WO2020/013542
PCT Pub. Date: Jan. 16, 2020

(65) Prior Publication Data
US 2021/0271384 A1    Sep. 2, 2021

(30) Foreign Application Priority Data
Jul. 11, 2018    (KR) .................. 10-2018-0080612

(51) Int. Cl.
G06F 3/04883    (2022.01)
H04W 4/80    (2018.01)
(Continued)

(52) U.S. Cl.
CPC .......... *G06F 3/04883* (2013.01); *G06F 3/038* (2013.01); *G06F 3/03545* (2013.01);
(Continued)

(58) Field of Classification Search
CPC .......................... G06F 3/03545; G06F 3/0488
(Continued)

(56) References Cited

U.S. PATENT DOCUMENTS 10,241,613 B2    3/2019  Shim et al.
2006/0123353 A1*  6/2006  Matthews ............. G06F 3/0482
                                        715/779
(Continued)

FOREIGN PATENT DOCUMENTS

KR    10-2014-0082618 A    7/2014
KR    10-2015-0026360 A    3/2015
(Continued)

OTHER PUBLICATIONS

[YouTube video clip entitled "How to change your Surface Pen Settings", uploaded on Dec. 28, 2016, by user oztablet. Retrieved from Internet: <https://youtu.be/rj5jRGj2zjl>] (Year: 2016).*
(Continued)

*Primary Examiner* — Koosha Sharifi-Tafreshi
(74) *Attorney, Agent, or Firm* — Cha & Reiter, LLC

(57) ABSTRACT

An electronic device is disclosed. The disclosed electronic device comprises: a touch screen display structure; a first wireless communication circuit; a second wireless communication circuit; a stylus pen including at least one button which can be pressed or touched; a processor operationally connected to the touch screen display structure and the first wireless communication circuit; and a memory operationally connected to the processor. A first application program including a first user interface, and a second application program including a second user interface are stored in the
(Continued)

memory. The memory has instructions stored therein which are configured to cause, when executed, the processor to: execute the first application program and second application program when a user input is received; display at least one of the first user interface and second user interface by means of the touch screen display structure; receive a first signal, which is generated by the press or touch of the button for a first time period, from the stylus pen through the first wireless communication circuit; select one from the first application program and second application program on the basis of the first signal; change at least part of information displayed on the screen, at least partly on the basis of the selection; receive a second signal, which is generated by the press or touch of the button for a second time period different from the first time period, from the stylus pen through the first wireless communication circuit; and at least partly on the basis of the selection, perform a function of the first application program or a function of the second application program in response to the second signal. Various other embodiments are possible.

15 Claims, 15 Drawing Sheets

(51) Int. Cl.
  *G06F 9/451* (2018.01)
  *G06F 3/041* (2006.01)
  *G06F 3/0354* (2013.01)
  *G06F 3/038* (2013.01)
  *G06F 3/04817* (2022.01)
(52) U.S. Cl.
  CPC ...... *G06F 3/04162* (2019.05); *G06F 3/04817* (2013.01); *G06F 9/451* (2018.02); *H04W 4/80* (2018.02); *G06F 2203/04108* (2013.01)
(58) Field of Classification Search
  USPC .......................................................... 345/179
  See application file for complete search history.

(56) References Cited

U.S. PATENT DOCUMENTS

| 2014/0168141 A1* | 6/2014 | Sasselli ................... G06F 3/044 |
| | | 345/174 |
| 2014/0253465 A1* | 9/2014 | Hicks .................... G06F 3/0416 |
| | | 345/173 |
| 2017/0322642 A1 | 11/2017 | Zhang et al. |
| 2018/0039382 A1 | 2/2018 | Jeong et al. |
| 2018/0239511 A1 | 8/2018 | No et al. |
| 2019/0087024 A1 | 3/2019 | Kim et al. |
| 2020/0076940 A1 | 3/2020 | Kim et al. |

FOREIGN PATENT DOCUMENTS

| KR | 10-2016-0047385 A | 5/2016 |
| KR | 10-2017-0090295 A | 8/2017 |
| KR | 10-2017-0126294 A | 11/2017 |
| KR | 10-2017-0130156 A | 11/2017 |
| WO | 2017/026570 A1 | 2/2017 |

OTHER PUBLICATIONS

[Website entitled "Launch multiple programs with one short in windows 10", published on Oct. 14, 2015, by author Sarab Jacobsson Purewal. Retrieved from the internet: <https://www.cnet.com/tech/computing/launch-multiple-programs-with-one-shortcut-in-windows-10/> ] (Year: 2015).*
[YouTube video clip entitled "Microsoft Surface Pen | How to use the Surface Pen", published on Dec. 11, 2015, by user Microsurface Surface. Retrieved from Internet: <https://youtu.be/g6Y9moAKegM>] (Year: 2015).*
[YouTube video clip entitled "Windows Ink & Pen settings on Windows 10 Anniversary Update", published on Jul. 15, 2016, by user Windows Central. Retrieved from Internet: <https://youtu.be/u8IVd0n1-30>] (Year: 2016).*
[Website entitled "How to Change Pen Shortcut Button Settings in Windows 10", published on Dec. 21, 2019, by user Shawn Brink. Retrieved from Internet: <https://www.tenforums.com/tutorials/111129-change-pen-shortcut-button-settings-windows-10-a.html>] (Year: 2019).*

* cited by examiner ic_ref id="N" />

ELECTRONIC DEVICE AND METHOD FOR PERFORMING FUNCTION OF ELECTRONIC DEVICE

CROSS REFERENCE TO RELATED APPLICATIONS

This application is a National Phase Entry of PCT International Application No. PCT/KR2019/008340, which was filed on Jul. 8, 2019, and claims a priority to Korean Patent Application No. 10-2018-0080612, which was filed on Jul. 11, 2018, the contents of which are incorporated herein by reference.

TECHNICAL FIELD

Various embodiments of the present disclosure relate to an electronic device and a method for performing a function thereof. In particular, various embodiments relate to a method for performing a function of an electronic device by using a stylus pen.

Background Art

Mobile communication terminals are increasingly used as electronic devices. A mobile communication terminal may provide multimedia contents such as music, video, etc., in addition to communication with others. In addition, the mobile communication terminal may perform various functions by processing signals generated according to a touch input of a user on a screen. For example, the mobile communication terminal may control to scroll a web page or play a content according to a user's touch input.

An electronic device may use a stylus pen as an auxiliary device for performing such functions. For example, the electronic device may perform various functions by processing signals generated according to a touch input on a screen by the stylus pen.

DISCLOSURE OF INVENTION

Technical Problem

A user may control an application program which is running in the foreground by using a stylus pen. For example, if the application program running in the foreground is a media application program for playing a content, the user may select a content and execute the same by using the stylus pen.

While controlling the application program running in the foreground by using the stylus pen, the user may want to control an application program running in the background. In this case, the user may access the application program running in the background by using a separate menu, but this may degrade continuity and accessibility of the user using the electronic device.

Accordingly, there is a demand for a method for a user to naturally control an application program which is running in the background by a minimum user operation. In particular, if the user can control the application program running in the background by using a stylus pen gripped by the user, user convenience can be further enhanced.

In addition, there is a demand for a method for a user to swiftly select and control one of a plurality of application programs by using a stylus pen, even when the plurality of application programs are running in the foreground by multi-windows.

Solution to Problem

An electronic device according to an embodiment includes: a housing including a first surface facing in a first direction and a second surface facing in a second direction opposite to the first direction; a touch screen display structure positioned in the housing and including a screen seen through the first surface; a first wireless communication circuit positioned in the housing and configured to support a Bluetooth protocol; a stylus pen including a capacitive part sensible by the touch screen display structure, and a second wireless communication circuit configured to support the Bluetooth protocol and to be paired with the first wireless communication circuit, the stylus pen including at least one button which is pressable or touchable; a processor positioned in the housing and operatively connected with the touch screen display structure and the first wireless communication circuit; and a memory positioned in the housing and operatively connected with the processor, and the memory stores a first application program including a first user interface and a second application program including a second user interface, and the memory further stores instructions that are configured to cause, when being executed, the processor to: execute the first application program and the second application program when a user input is received; display at least one of the first user interface or the second user interface on the screen; receive a first signal generated by a press or a touch on the button from the stylus pen during a first time; select one of the first application program or the second application program; change at least a part of the screen, based on at least a part of the selection; receive a second signal generated by a press or a touch on the button from the stylus pen during a second time which is different from the first time; and perform a function of the first application program or a function of the second application program in response to the second signal, based on at least a part of the selection.

A method for performing a function of an electronic device according to an embodiment includes: executing a first application program and a second application program when a user input is received; displaying at least one of a first user interface including the first application program or a second user interface including the second application program on a screen; receiving a first signal generated by a press or a touch on a button of a stylus pen communication-paired with the electronic device by use of a Bluetooth protocol, from the stylus pen during a first time; selecting one of the first application program or the second application program; changing at least a part of the screen, based on at least a part of the selection; receiving a second signal generated by a press or a touch on the button from the stylus pen during a second time which is different from the first time; and performing a function of the first application program or a function of the second application program in response to the second signal, based on at least a part of the selection.

A computer program product including a computer readable recording medium according to an embodiment stores, in a computer, instructions for executing the operations of: executing a first application program and a second application program; displaying at least one of a first user interface including the first application program or a second user interface including the second application program on a screen; receiving a first signal generated by a press or a touch on a button of a stylus pen communication-paired with an electronic device by use of a Bluetooth protocol, from the stylus pen during a first time; selecting one of the first application program or the second application program, based on the first signal; changing at least a part of the screen, based on at least a part of the selection; receiving a second signal generated by a press or a touch on the button from the stylus pen during a second time which is different from the first time; and performing a function of the first application program or a function of the second application program in response to the second signal, based on at least a part of the selection.

Advantageous Effects of Invention

A user can naturally control an application program running in the background by a minimum user operation.

Since a user can control an application program running in the background by using a stylus pen gripped by the user, user convenience can further be enhanced.

Even when a plurality of application programs are running in the foreground by multi windows, a user can select one of the plurality of application programs by using a stylus pen and can swiftly control the same.

BEST MODE FOR CARRYING OUT THE INVENTION

Figure 1:
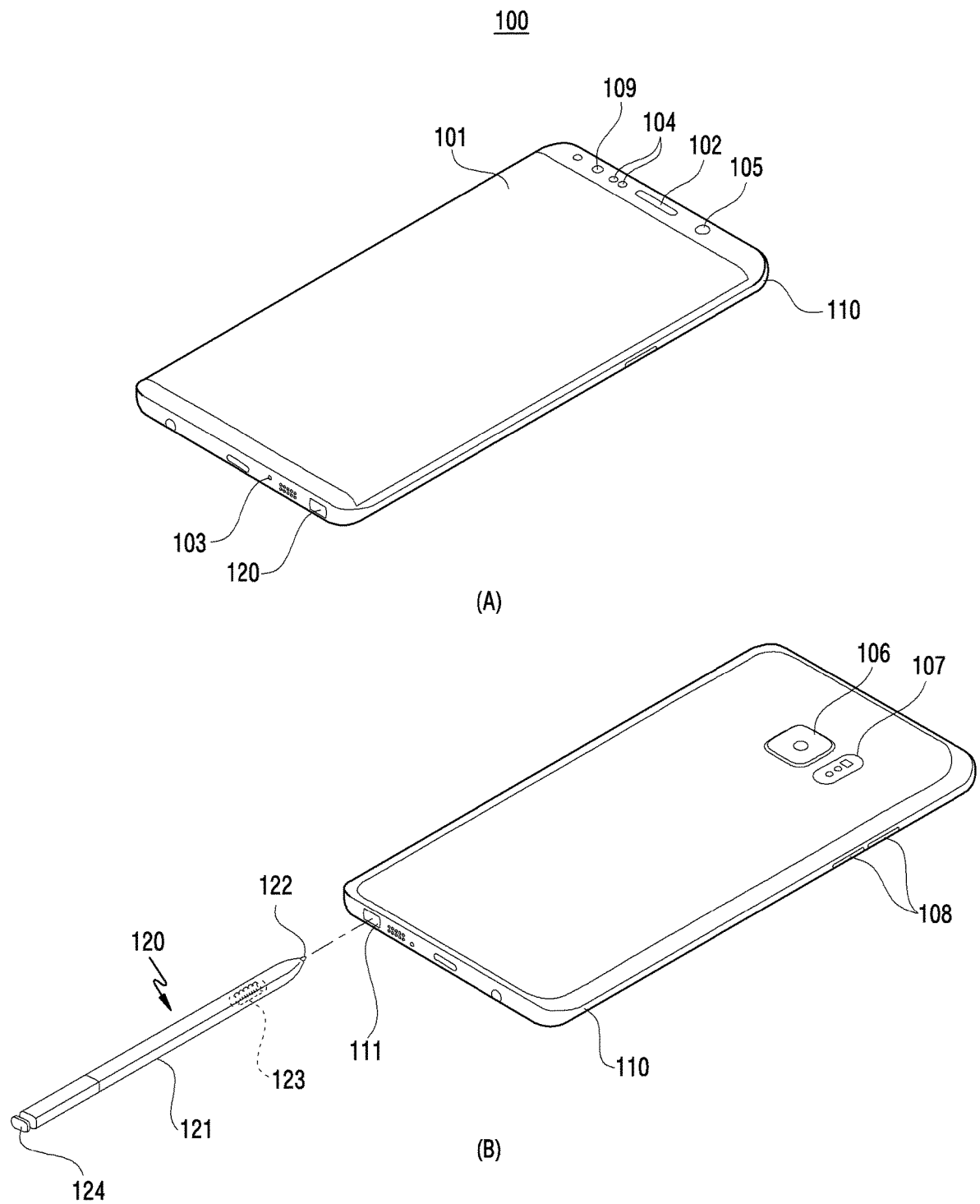
FIG. 1 is a perspective view of an electronic device including a removable stylus pen according to various embodiments of the present disclosure.

An electronic device according to various embodiments disclosed herein may be various types of devices. The electronic device may include, for example, a portable communication device (for example, a smartphone), a computer device, a portable multimedia device, a portable medical device, a camera, a wearable device, or a home appliance. The electronic device according to an embodiment of the present disclosure is not limited to the above-mentioned devices.

It should be appreciated that various embodiments of the present disclosure and the terms used therein are not intended to limit the technological features set forth herein to particular embodiments, and include various changes, equivalents, or replacements for a corresponding embodiment. With regard to the description of the drawings, similar reference numerals may be used to refer to similar or related elements. A singular form of a noun corresponding to an item may include one or more of the things, unless the relevant context clearly indicates otherwise. In the present disclosure, the expressions "A or B," "at least one of A and B," "at least one of A or B," "A, B, or C," "at least one of A, B, and C," and "at least one of A, B, or C" may include all possible combinations of the items enumerated with a corresponding expression. As used herein, such terms as "1st" and "2nd," or "first" or "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

Hereinafter, the present disclosure will be described in detail with reference to the accompanying drawings.

Views (a) and (b) of FIG. 1 are perspective views of an electronic device 100 including a removable stylus pen according to various embodiments of the PRESENT disclosure.

Referring to views (a) and (b) of FIG. 1, a touch screen display structure 101, which includes a screen seen by a user through a front surface of a housing 110, may be provided in the housing 110 of the electronic device 100. A speaker device 102 may be installed at an upper side of the touch screen display structure 101 to output a voice of the person on the other side. A microphone device 103 may be installed at a lower side of the touch screen display structure 101 to transmit a voice of a user of the electronic device to the person on the other side.

According to an embodiment, the touch screen display structure 101 may include a touch circuit including a touch sensor. According to an embodiment, the touch screen display structure 101 may include a pressure sensitive touch screen device including a touch sensor and a force sensor reacting to a touch pressure. The touch circuit may include a touch-sensing pad to sense a human body part, and a stylus pen-sensing pad to sense a capacitive part of a stylus pen 120.

According to an embodiment, components for performing various functions of the electronic device 100 may be disposed on the periphery of the speaker device 102. The components may include at least one sensor module 104. The sensor module 104 may include at least one of, for example, an illuminance sensor (for example, a light sensor), a proximity sensor, an infrared sensor, or an ultrasonic sensor. According to an embodiment, the components may include a first camera device 105.

According to an embodiment, the components may include a light emitting diode (LED) indicator 109 to indicate state information of the electronic device 100 for the user. According to an embodiment, components may be disposed on a rear surface of the electronic device 100. According to an embodiment, the components may include at least one of a second camera device 106, various sensor modules (not shown) (for example, a heart rate sensor, an illuminance sensor, an ultrasonic sensor, etc.), and an illumination device 107. According to an embodiment, a physical key button 108 (for example, a side key button) may protrude from a side surface of the electronic device.

According to an embodiment, the electronic device 100 may include the stylus pen 120 disposed in a pen mounting space (or recess) 111 formed on the housing 110 to be selectively removable. According to an embodiment, the stylus pen 120 may include a coil body 123 disposed in a hollow type pen housing 121 having a predetermined length, and a substrate (not shown) electrically connected with the coil body 123. According to an embodiment, a sharp tip 122 may be formed at an end of the pen housing 121, such that the tip 122 can guide an input operation to be easily performed.

According to an embodiment, the electronic device 100 may include an electromagnetic resonance (EMR) sensor pad (not shown) to detect an input position of the stylus pen 120 in an electromagnetic induction method. According to an embodiment, the EMR sensor pad may include a plurality of conductive patterns. According to an embodiment, the electronic device 100 may generate an electromagnetic field by applying power to the conductive patterns, and, when the stylus pen 120 contacts or hovers within a predetermined distance from the touch screen display structure 101, the electronic device 100 may detect a position of the stylus pen 120 by receiving a feedback signal regarding a resonant frequency of the coil body 123 vibrating by the electromagnetic field.

According to an embodiment, the electronic device 100 may include a detection member (not shown) to detect a feedback signal regarding a resonant frequency of the coil body 120 when the stylus pen 120 is completely inserted into the pen mounting space 111. According to an embodiment, the detection member may use the resonant frequency of the coil body 123 provided for the electromagnetic induction method as a detection means for detecting whether the stylus pen 120 is inserted. According to an embodiment, the electronic device 100 may detect the feedback signal of the coil body 120 received at the detection member, and may determine whether the stylus pen 120 is inserted into the pen mounting space 111 of the electronic device 100.

According to an embodiment, the stylus pen 120 may include at least one button 124 which is pressable or touchable. The button 124 may be positioned at an end of the stylus pen 120 or may be positioned at a portion of the stylus pen 120 that is easy for the user to operate (for example, an area corresponding to the index finger of the user gripping the stylus pen 120), as shown in FIG. 1.

According to an embodiment, the stylus pen 120 may be provided with a wireless communication circuit (not shown) designed to support a short-range communication protocol. The short-range communication protocol may include at least one of, for example, a Bluetooth protocol, a Bluetooth low energy (BLE) protocol, a wireless LAN (Wi-Fi) protocol, a Zigbee protocol, a Wi-Fi Direct (WFD) protocol, a ultra wide band (UWB) protocol, an infrared data association (IrDA) protocol, a near field communication (NEC) protocol, and an Ant+ protocol, and preferably, at least one of the Bluetooth protocol and the BLE protocol may be used. The wireless communication circuit (not shown) of the stylus pen 120 may be paired with a wireless communication circuit (not shown) of the electronic device 100 according to the above-described short-range communication protocol. The stylus pen 120 and the electronic device 100 being paired with each other may include establishing a communication connection therebetween and forming a communication channel to transmit/receive a control signal or data.

According to an embodiment, a signal that is generated in response to the button 124 of the stylus pen 120 being pressed or touched by the user may be transmitted to the wireless communication circuit of the electronic device 100 through the wireless communication circuit of the stylus pen 120 described above. In this case, to distinguish between a signal that the electronic device 100 receives from the touch circuit and a signal that the electronic device 100 receives through the wireless communication circuit, the present disclosure refers to the signal received from the touch circuit as a touch signal, and refers to the signal received from the wireless communication circuit as a remote signal. A remote signal that the electronic device 100 receives from the stylus pen 120 by using the BLE protocol among the wireless communication protocols may be referred to as a BLE signal.

According to an embodiment, the stylus pen 120 may include a capacitive part which is detectable by the touch screen display structure 101. The touch screen display structure 101 may be provided with the stylus pen-sensing pad for sensing the capacitive part to correspond thereto.

In the following description, a processor (not shown) of the electronic device 100 may correspond to a processor 1320 of an electronic device 1301 of FIG. 13. In addition, the touch screen display structure 101 of the electronic device 100 may correspond to a display device 1360 of the electronic device 1301 of FIG. 13. In addition, a wireless communication module (not shown) of the electronic device 100 may correspond to a wireless communication module 1392 of the electronic device 1301 of FIG. 13. In addition, a memory (not shown) of the electronic device 100 may correspond to a memory 1330 of the electronic device 1301 of FIG. 13.

In various embodiments, the electronic device 100 may include the housing 110 including a first surface facing in a first direction and a second surface facing in a second direction opposite to the first direction, the touch screen display structure 101 positioned in the housing and including a screen seen through the first surface; and a first wireless communication module 1392 positioned in the housing 110 and set to support a Bluetooth protocol. In addition, the electronic device 100 may include the stylus pen 120 including a second wireless communication circuit (not shown) which supports the Bluetooth protocol and is paired with the first wireless communication module 1392, and at least one button 124 which is pressable or touchable. In addition, the electronic device 100 may include a processor 1320 which is positioned in the housing 110 and is operatively connected with the touch screen display structure 101 and the first wireless communication module 1392, and a memory 1330 which is positioned in the housing 110 and is operatively connected with the processor 1320. In this case, the memory 1330 may store a first application program including a first user interface and a second application program including a second user interface. In addition, the memory 1330 may store instructions that are configured to cause, when being executed, the processor 1320 to: execute the first application program and the second application program when a user input is received; display at least one of the first user interface or the second user interface through the touch screen display structure 101; receive a first signal generated by a press or a touch on the button 124 of the stylus pen 120 from the stylus pen 120 through the first wireless communication module 1392 during a first time; select one of the first application program or the second application program, based on the first signal; change at least a part of information displayed on the screen, based on at least a part of the selection; receive a second signal generated by a press or a touch on the button 124 of the stylus pen 120 from the stylus pen 120 through the first wireless communication module 1392 during a second time which is different from the first time; and perform a function of the first application program or a function of the second application program in response to the second signal, based on at least a part of the selection.

Accordingly, a user can easily select an application program that the user wants to control by using the stylus pen 120. That is, the user can select a specific application program from a plurality of application programs simply by pressing or touching the button 124 of the stylus pen 120, so that user convenience of using the electronic device 100 can be greatly enhanced. In addition, when an application program is selected, a function of the application program can be performed simply by pressing or touching the button 124 of the stylus pen 120 additionally, and accordingly, the application program can be controlled continuously and rapidly.

In various embodiments, a short-range communication protocol for communication of the electronic device 100 and the stylus pen 120 may include a Bluetooth protocol and a BLE protocol.

In particular, when the BLE protocol is used, power consumption of the electronic device 100 and the stylus pen 120 can be reduced, and operations according to the present disclosure can be performed even when the electronic device 100 or the stylus pen 120 is in a sleep mode.

In various embodiments, the touch screen display structure 101 of the electronic device 100 may include a touch-sensing pad (not shown) for sensing a human body part, and a stylus pen-sensing pad (not shown) for sensing the capacitive part of the stylus pen 120.

In various embodiments, the instructions may be configured to cause the processor 1320 to display only one of the first user interface or the second user interface on the screen. In addition, the instructions may be configured to cause the processor 1320 to display the first user interface and the second user interface on the screen.

Accordingly, the user can selectively control an application program running in the foreground or background, or can selectively control one application program from among a plurality of application programs running in multi windows. That is, in an environment where various application programs are provided, the user can remotely control an application program by using the stylus pen according to the present disclosure.

According to various embodiments, the instructions may be configured to perform a function of the application program selected in response to the first signal, based on at least a part of the selection.

In various embodiments, when the processor 1320 changes a part of information displayed on the screen based on at least a part of the selection, the instructions may be configured to cause the processor 1320 to display a GUI indicating the function of the first application program or the function of the 30 second application program on the screen. In this case, the GUI may include a play icon related to playing of a content included in a media application program, a stop icon related to stopping of the play of the content, or an end icon related to ending of the play of the content.

In various embodiments, when the processor 1320 changes a part of the information displayed on the scree based on at least a part of the selection, the instructions may be configured to cause the processor 1320 to highlight the selected application program or to display the selected application program on a foreground screen.

In various embodiments, the touch screen display structure 101 may further include a touch circuit to sense a touch input or a hovering input on the screen. In this case, the instructions may be configured to cause the processor 1320 to receive a third signal generated according to the touch input or hovering input on the screen by the stylus pen 120 through the touch circuit, and to perform the function of the first application program or the function of the second application program in response to the third signal. In this case, the first signal and the second signal received through the first wireless communication module 1392 may be remote signals, and the third signal received through the touch circuit may be a touch signal.

Hereinafter, a process of performing a function of the electronic device 100 according to various embodiments will be described in detail with reference to the drawings. Embodiments described below are merely examples of the present disclosure, and some of the embodiments may be omitted to achieve objects of the present disclosure or a new process may be added. In addition, the objects of the present disclosure can be achieved by a combination of embodiments or a combination of processes configuring the embodiments.

Figure 2:
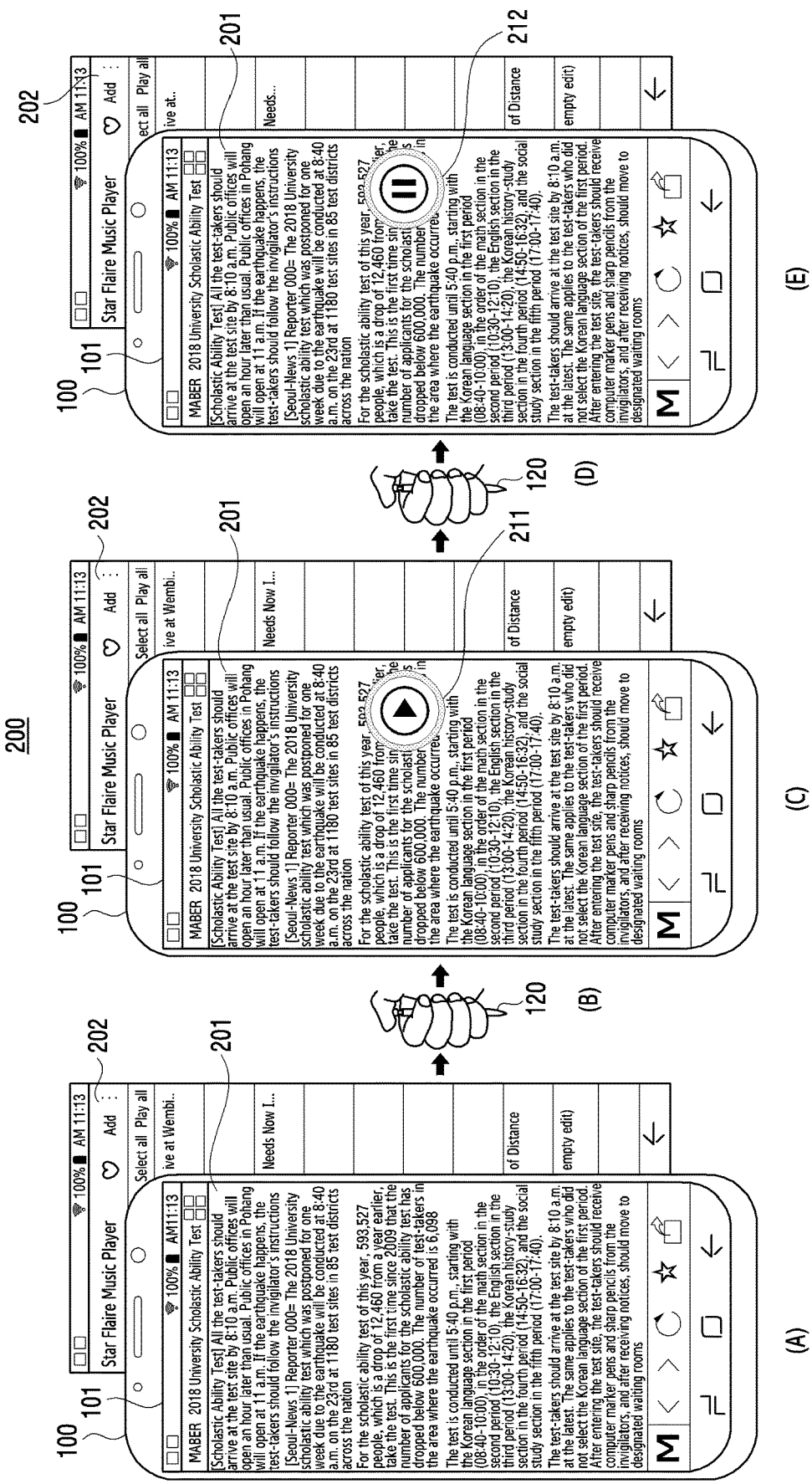
FIGS. 2 to 11 are views illustrating an electronic device performing functions according to various embodiments of the present disclosure.

FIG. 2 illustrates views 200 explaining the electronic device 100 performing functions according to an embodiment of the present disclosure.

First, the processor 1320 of the electronic device 100 may execute a first application program 201 and a second application program 202. The first application program 201 and the second application program 202 being executed may include, for example, the first application program 201 and the second application program 202 being executed simultaneously or being executed at time intervals. In addition, the first application program 201 and the second application program 202 being executed may include the first application program 201 and the second application program 202 being executed altogether by a single user input, or the first application program 201 and the second application program 202 being executed in sequence by respective user inputs having a time interval.

When the first application program 201 and the second application program 202 are executed, the processor 1320 may control the touch screen display structure 101 to display one of a first user interface included in the first application program 201 or a second user interface included in the second application program 202 on the screen. In this case, when the first application program 201 is running in the foreground and the second application program 202 is running in the background, the processor 1320 may control the touch screen display structure 101 to display the first user interface included in the first application program 201 on the screen.

In view (a) of FIG. 2, the processor 1320 may control the touch screen display structure 101 to display the first user interface 201 of an Internet search application program on the screen as the first application program 201 running in the foreground, and may execute a media application program 202 in the background as the second application program 202.

In this condition, the user may press the button 124 of the stylus pen 120 communication-paired with the electronic device 100, or may touch a certain area (for example, a touch pad area) of the stylus pen 120 as shown in view (b) of FIG. 2. In this case, the electronic device 100 may receive a first remote signal (for example, a BLE signal) generated by the press or touch on the button 124 of the stylus pen 120, from the stylus pen 120 through the wireless communication module 1392 during a first time.

When the first remote signal is received, the electronic device 100 may select one of the first application program 201 or the second application program 202 based on the first remote signal.

For example, the electronic device 100 may select an application program that supports a function corresponding to (or mapped onto) the first remote signal from the first application program 201 and the second application program 202. When there are a plurality of application programs supporting the function corresponding to the first remote signal, the electronic device 100 may select an application program that is recently executed or recently displayed on the screen in preference to the other application programs. For example, when the application program running in the foreground supports the function corresponding to the remote signal, the electronic device 100 may select the application program running in the foreground in preference to the other application programs. In another example, when the application program running in the foreground does not have the function corresponding to the remote signal and the application program running in the background supports the function corresponding to the remote signal, the electronic device 100 may select the application program running in the background.

Based on at least a part of selection of one of the first application program 201 or the second application program 202, the electronic device 100 may change a part of information displayed on the screen (for example, the touch screen display structure 101) as shown in view (c) of FIG. 2. For example, the processor 1320 of the electronic device 100 may control the touch screen display structure 101 to display a first GUI 211 indicating the function to be performed by a remote signal. The first GUI 211 may be an image, a text, a video or a combination thereof, and for example, may be a floating icon, a bubble icon (for example, an air command), a pop-up, an icon included in a quick panel, etc.

For example, the processor 1320 of the electronic device 100 may control the touch screen display structure 101 to overlap the first GUI 211 while displaying the first user interface 210 on the touch screen display structure 101. In another example, the processor 1320 may control the touch screen display structure 101 to display the first GUI 211 on an area that does not overlap the first user interface 201. In still another example, the processor 1320 may render a certain area of the first user interface 201 perforated, and may control the touch screen display structure 101 to display the first GUI 211 on the perforated area.

Specifically, if the selected application program is the media application program 202 running in the background, the processor 1320 may control the touch screen display structure 101 to display a play icon 211 related to a content included in the media application program 202.

As another example of changing a part of information displayed on the touch screen display structure 101, the electronic device 100 may display the selected application program in the foreground. Specifically, if the second application program 202 running in the background is selected, the electronic device 100 may display the second application program 202 in the foreground, and may execute the first application program 201 in the background.

As shown in view (d) of FIG. 2, the user may press the button 124 of the stylus pen 120 or may touch a certain area (for example, a touch pad area) of the stylus pen 120 while the first GUI 211 is being displayed. In this case, the electronic device 100 may receive a second remote signal generated by the press or touch on the button 124 of the stylus pen 120 from the stylus pen 120 through the wireless communication module 1392 during a second time which is different from the first time of view (b) of FIG. 2.

When the second remote signal is received, the processor 1320 of the electronic device 100 may perform a function of the first application program 210 or a function of the second application program 202 in response to the second remote signal, based on at least a part of the selection of the application program in view (b) of FIG. 2. If the second application program 202 is selected, the processor 1320 may perform the function of the second application program 202 in response to the second remote signal. For example, if the second application program 202 is the media application program 202, the processor 1320 may play a content included in the media application program 202.

In this case, as shown in view (e) of FIG. 2, the processor 1320 may control the touch screen display structure 101 to display a second GUI 212 indicating the function of the application program corresponding to the second remote signal on the screen. The processor 1320 may control the touch screen display structure 101 to overlap the second GUI 212 while displaying the first user interface 201 on the screen. In another example, the processor 1320 may control the touch screen display structure 101 to display the second GUI 212 on an area that does not overlap the first user interface 201. In still another example, the processor 1320 may render a certain area of the first user interface 201 perforated, and may control the touch screen display structure 101 to display the second GUI 212 on the perforated area.

Specifically, if the function corresponding to the second remote control signal is a function of playing a content included in the program of the media application program 202, the processor 1320 may control the touch screen display structure 101 to display an icon indicating that the content is being played, or to display an icon for controlling the playing content in response to the second remote control signal (for example, a pause icon related to pausing of play of the content or an end icon related to ending of play of the content).

Figure 3:
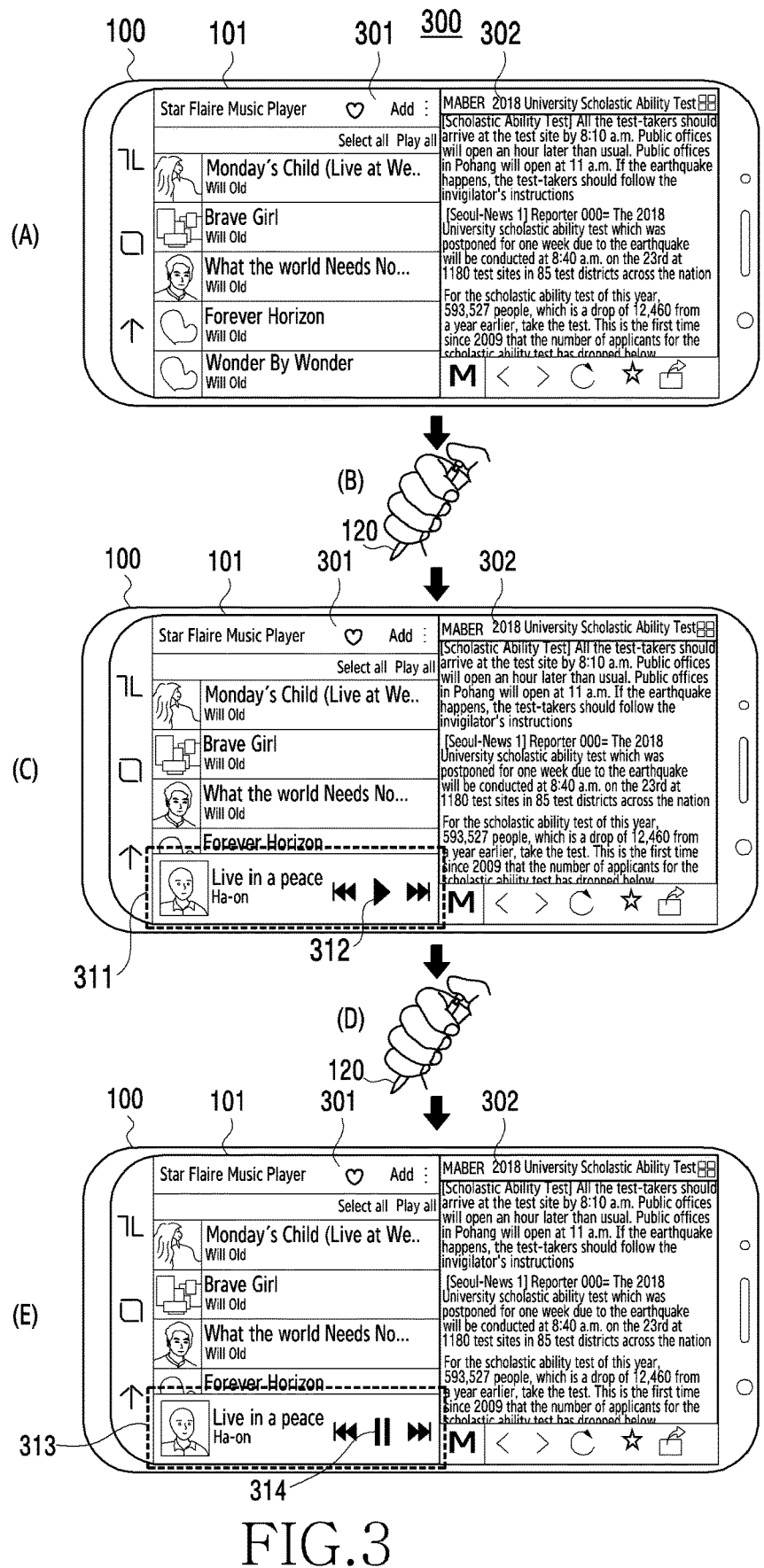

FIG. 3 illustrate views 300 explaining the electronic device 100 performing functions according to another embodiment of the present disclosure.

First, the processor 1320 of the electronic device 100 may execute a first application program 301 and a second application program 302.

When the first application program 301 and the second application program 302 are executed, the processor 1320 may control the touch screen display structure 101 to display both of a first user interface included in the first application program 301 and a second user interface included in the second application program 302 on the screen. For example, the processor 1320 may execute a multi window function and may control the touch screen display structure 101 to display the first user interface and the second user interface in respective windows.

In view (a) of FIG. 3, the processor 1320 may display the first user interface of a media application program 301 on the left of the screen as the first application program 301, and may display the second user interface of an Internet search application program 302 on the right of the screen as the second application program 302. In this case, the positions of the first user interface and the second user interface are merely examples, and the left and right positions of the first user interface and the second user interface may change or the first user interface and the second user interface may be disposed vertically, based on an operation of the multi windows or a control of a user.

In this condition, the user may press the button 124 of the stylus pen 120 communication-paired with the electronic device 100, or may touch a certain area (for example, a touch pad area) of the stylus pen 120 as shown in view (b) of FIG. 3. In this case, the electronic device 100 may receive a first remote signal (for example, a BLE signal) generated by the press or touch on the button 124 of the stylus pen 120 from the stylus pen 120 through the wireless communication module 1392 during a first time.

When the first remote signal is received, the electronic device 100 may select one of the first application program 301 or the second application program 302, based on the first remote signal. Herein, the electronic device 100 may select one of the first application program 310 or the second application program 302 in the method described above with reference to view (b) of FIG. 2. In FIG. 3, it is assumed that the electronic device 100 selects the first application program 301 having a high priority, based on the first remote signal.

Based on at least a part of selection of one of the first application program 301 or the second application program 302, the electronic device 100 may change a part of information displayed on the screen as shown in view (c) of FIG. 3. For example, the processor 1320 of the electronic device 100 may control the touch screen display structure 101 to display a first control window 311 indicating a function to be performed by control of the stylus pen 120. Specifically, if the first application program 301 selected by the electronic device 100 is the media application program 301 running in the left window of the multi windows, the processor 1320 may control the touch screen display structure 101 to display the first control window 311 for controlling a content included in the media application program 301. The first control window 311 may include a play icon 312 related to playing (or execution) of the content.

While the first control window 311 is being displayed, the user may press the button 124 of the stylus pen 120 communication-paired with the electronic device 100, or may touch a certain area (for example, a touch pad area) of the stylus pen 120 as shown in view (d) of FIG. 3. In this case, the electronic device 100 may receive a second remote signal generated by the press or touch on the button 124 of the stylus pen 120 from the stylus pen 120 through the wireless communication module 1392 during a second time which is different from the first time of view (b) of FIG. 3.

When the second remote signal is received, the processor 1320 of the electronic device 100 may perform the function of the first application program 301 in response to the second remote signal, based on at least a part of the selection of the application program in view (b) of FIG. 3. For example, if the first application program is the media application program 301, the electronic device 100 may play a content included in the media application program 301.

In addition, as shown in view (e) of FIG. 3, the processor 1320 may control the touch screen display structure 101 to display a second control window 313 indicating the function of the application program 301 corresponding to the second remote signal on the screen. The second control window 313 indicating the function of the application program 301 corresponding to the second remote signal may include, for example, a control window for controlling the content. In this case, the second control window 313 may include a pause icon 314 related to pausing of play of the content or an end icon related to ending of play of the content.

Figure 4:
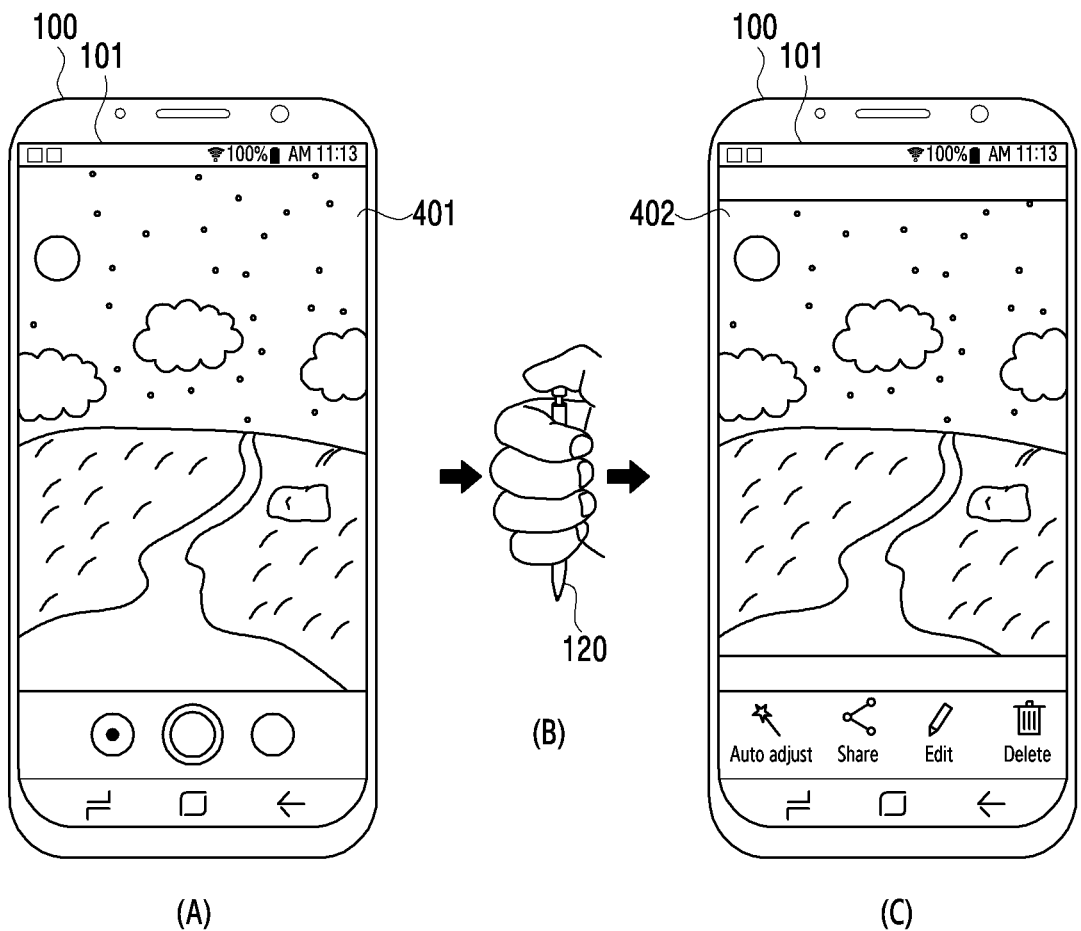
Figure 5:
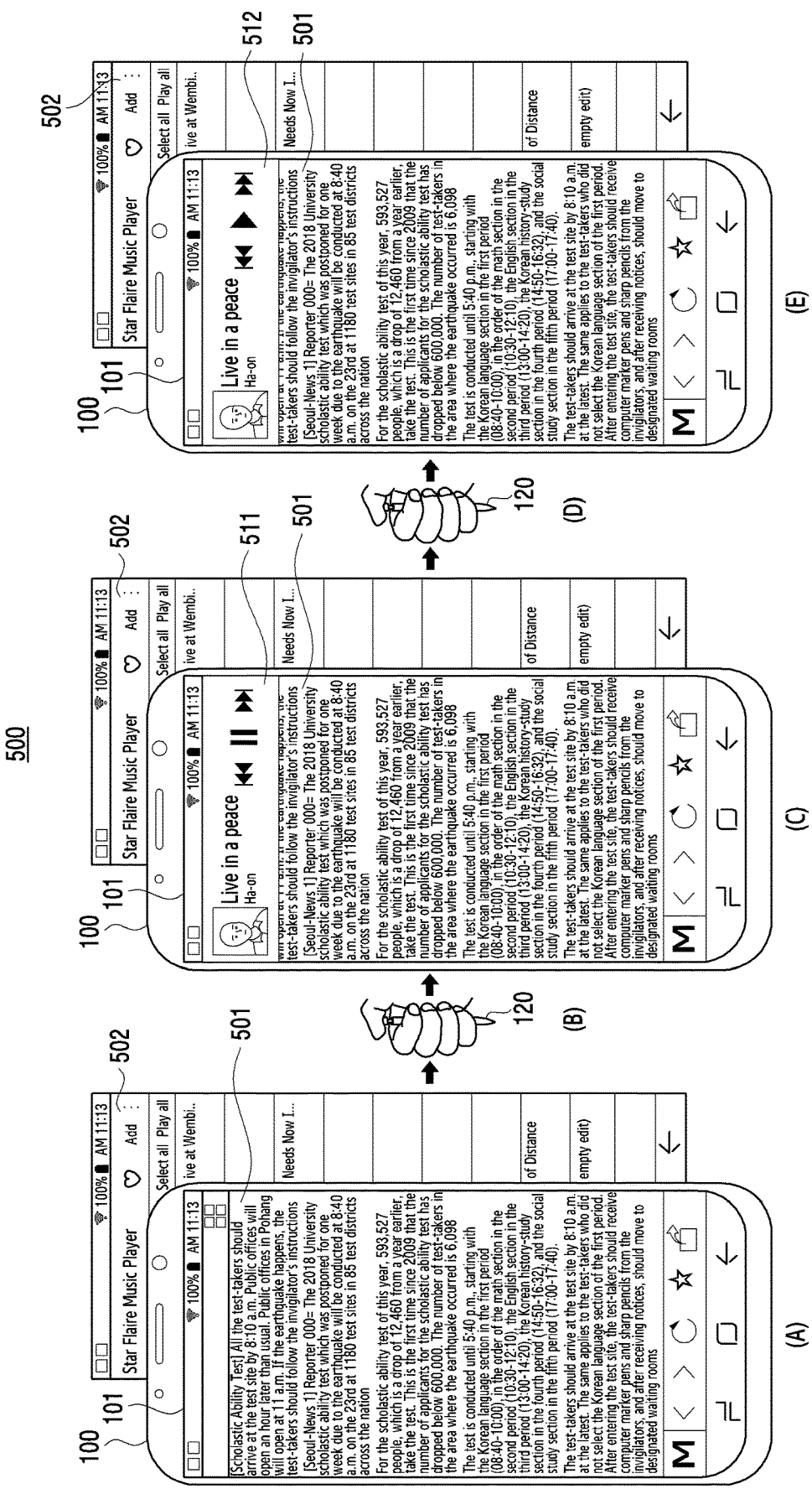

FIGS. 4 and 5 are views 400, 500 illustrating the electronic device 100 performing functions according to another embodiment of the present disclosure.

In FIGS. 4 and 5, the user of the electronic device 100 may press the button 124 of the stylus pen 120 communication-paired with the electronic device 100, or may touch a certain area (for example, a touch pad area) of the stylus pen 120. In this case, the processor 1320 of the electronic device 100 may receive a remote signal (for example, a BLE signal) generated by the press or touch on the button 124 of the stylus pen 120 through the wireless communication module 1392.

The electronic device 100 may execute a first application program in the foreground and may execute a second application program in the background. When the remote signal is received, the electronic device 100 may select one of the first application program or the second application program.

For example, the electronic device 100 may select an application program that supports a function corresponding to the remote signal by considering a recently executed application program first. Specifically, the electronic device 100 may determine whether the application program running in the foreground supports the function corresponding to the remote signal. If the application program supports the function corresponding to the remote signal, the electronic device 100 may select the application program running in the foreground as the application program to execute the function corresponding to the remote signal. On the other hand, if the application program running in the foreground does not have the function corresponding to the remote signal, the electronic device 100 may select an application program supporting the function corresponding to the remote signal from among application programs running in the background according to priority.

When the application program supporting the function corresponding to the remote signal is selected, the electronic device 100 may perform the function corresponding to the remote signal with respect to the selected application program.

For example, as shown in view (a) of FIG. 4, the processor 1320 of the electronic device 100 may control the touch screen display structure 101 to display a user interface of a camera application program 401 supporting a function corresponding to a remote signal in the foreground. In this condition, as shown in view (b) of FIG. 4, the user may press the button 124 of the stylus pen 120 communication-paired with the electronic device 100, or may touch a certain area of the stylus pen 120. The electronic device 100 may receive a remote signal generated by the press or touch on the button 124 of the stylus pen from the stylus pen 120 through the wireless communication module 1392. When the remote signal is received, the electronic device 100 may select the camera application program 401 which is running in the foreground and supports the function corresponding to the remote signal. In addition, as shown in view (c) of FIG. 4, the electronic device 100 may perform a shooting function of the camera application program 401 as the function corresponding to the remote signal, and may control the touch screen display structure 101 to display a user interface 402 indicating that the shooting function is performed in the foreground.

In another example, as shown in view (a) of FIG. 5, the processor 1320 of the electronic device 100 may control the touch screen display structure 101 to display a user interface of an Internet search application program 501 that does not support a function corresponding to a remote signal in the foreground. At this time, the processor 1320 may be executing a media application program 502 supporting the function corresponding to the remote signal in the background. In this condition, as shown in view (b) of FIG. 5, the user may press the button 124 of the stylus pen 120 communication-paired with the electronic device 100, or may touch a certain area of the stylus pen 120. The electronic device 100 may receive a first remote signal generated by the press or touch on the button 124 of the stylus pen 120 from the stylus pen 120 through the wireless communication module 1392. When the first remote signal is received, the electronic device 100 may not disregard processing of the first remote signal and may select the media application program 502 supporting a function corresponding to the first remote signal. In addition, as the function corresponding to the first remote signal, the electronic device 100 may play a content included in the media application program 502. For example, the electronic device 100 may play the content in a content list of the media application program 502 according to priority. The priority may be determined according to a recent playing time of the content, user preference, popularity of the content, etc. for example. In this case, as shown in view (c) of FIG. 5, the electronic device 100 may control the touch screen display structure 101 to display a first control window 511 (for example, a control window in the form of a noti. bar) on the screen to pause the playing content.

In this case, as shown in view (d) of FIG. 5, the user may additionally press the button 124 of the stylus pen 120 communication-paired with the electronic device 100 or may additionally touch a certain area of the stylus pen 120. The electronic device 100 may receive a second remote signal generated by the press or touch on the button 124 of the stylus pen 120 from the stylus pen 120 through the wireless communication module 1392. When the second remote signal is received, the electronic device 100 may select the media application program 502 supporting a function corresponding to the second remote signal. If the media application program 502 is playing a content, the electronic device 100 may pause the playing content as the function corresponding to the second remote signal. In this case, as shown in view (e) of FIG. 5, the processor 1320 of the electronic device 100 may control the touch screen display structure 101 to display a second control window 512 (for example, a control window in the form of a noti. bar) for playing the paused content on the screen.

Figure 6:
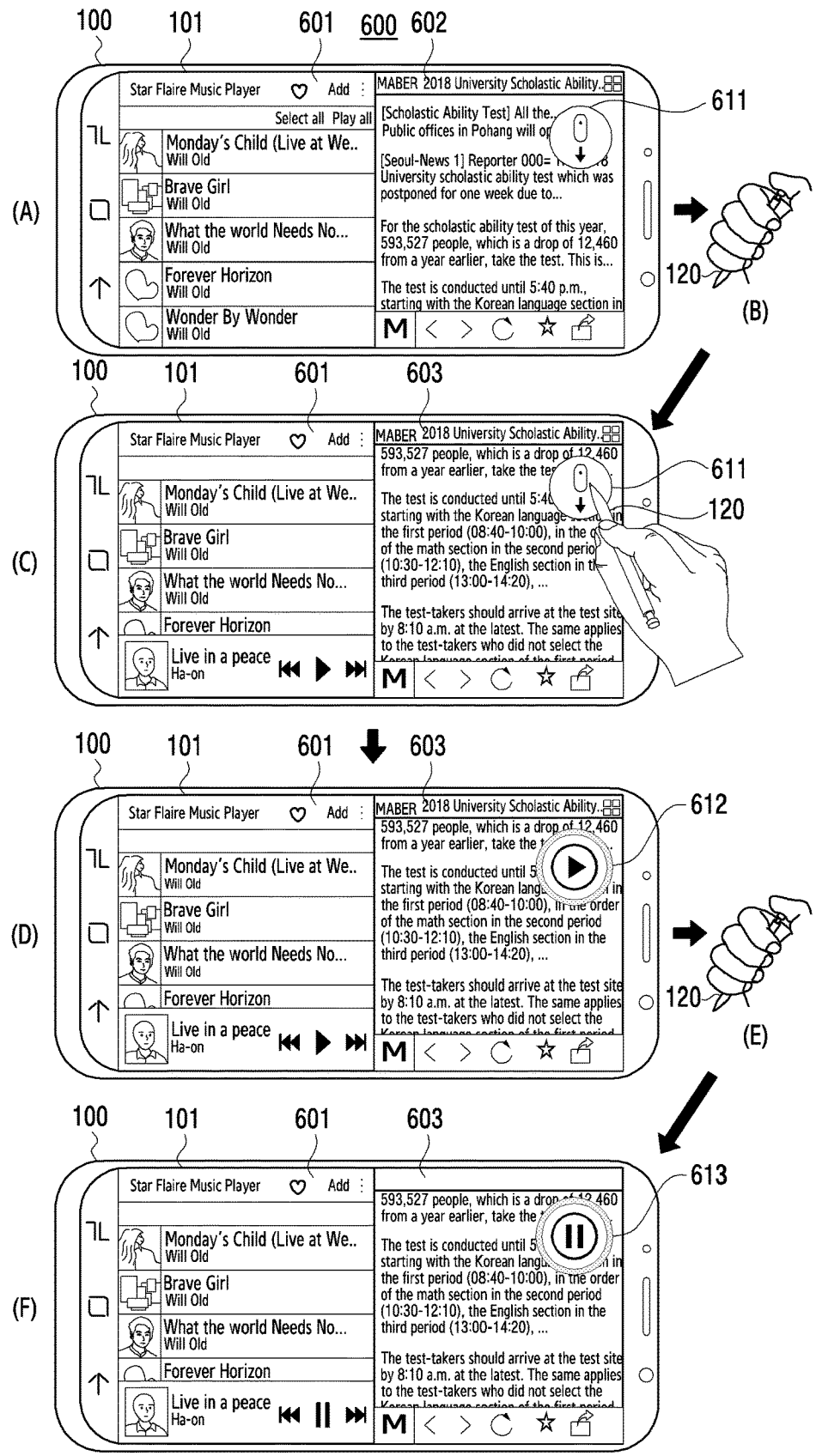

FIG. 6 illustrates views 600 explaining the electronic device 100 performing functions according to another embodiment of the present disclosure.

In view (a) of FIG. 6, the processor 1320 of the electronic device 100 may execute a first application program 601 and a second application program 602. The processor 1320 of the electronic device 100 may execute a multi window function, and may control the touch screen display structure 101 to display a first user interface 601 included in the first application program and a second user interface 602 included in the second application program in respective windows. In this case, the processor 1320 of the electronic device 100 may already select an application program to execute a function corresponding to a remote signal received from the stylus pen 120. In view (a) of FIG. 6, the selected application program may be an Internet search application program 602 including the second user interface displayed on the right of the screen, for example. In this case, the processor 1320 of the electronic device 100 may control the touch screen display structure 101 to display a first GUI 611 (for example, an air command) indicating the function corresponding to the remote signal. The first GUI 611 in view (a) of FIG. 6 may be a GUI indicating a scroll function as the function corresponding to the remote signal.

In this case, when the user presses the button 124 of the stylus pen 120 or touches a certain area of the stylus pen 120 as shown in view (a) of FIG. 6, the electronic device 100 may receive a first remote signal generated from the stylus pen 120 through the remote communication module 1392. When the first remote signal is received, the electronic device 100 may perform the function corresponding to the first remote signal with respect to the selected application program. For example, as shown in view (c) of FIG. 6, the electronic device 100 may control the touch screen display structure 101 to display a third user interface 603 by scrolling the second user interface of the Internet search application program 602 in one direction.

In this condition, the user may want to switch the application program to execute a function corresponding to a remote signal. Accordingly, in view (c) of FIG. 6, the user may do a long press on the GUI 611 by using the stylus pen 120 for a predetermined time (for example, a value between 0.5 second and 1.5 seconds). When a touch signal corresponding to the long press of the user is received, the electronic device 100 may switch the application program to execute the function corresponding to the remote signal to another application program. For example, when there are a plurality of application programs running in the foreground, the electronic device 100 may select an application program to execute the function corresponding to the remote signal from application programs other than the application program already selected from the plurality of application programs. Specifically, if the application program to execute the function corresponding to the remote signal is the Internet search application program displayed on one side of the multi windows before a touch signal is received, the electronic device 100 may select the media application program 601 displayed on the other side of the multi windows as the application program to execute the function corresponding to the remote signal.

When the application program to execute the function corresponding to the remote signal is selected, the electronic device 100 may control the touch screen display structure 101 to display a second GUI 612 (for example, an air command, etc.) indicating the function corresponding to the remote signal with respect to the selected application program as shown in view (d) of FIG. 6. The second GUI 612 in view (d) of FIG. 6 may be a play icon indicating that a function of playing a content can be performed as the function corresponding to the remote signal.

In various embodiments, the electronic device 100 may highlight the selected application program. That is, the electronic device 100 may highlight the selected application program to inform the user of which application program is enabled to perform the function corresponding to the remote signal. Highlighting the selected application program may include, for example, highlighting a border of the screen displaying the selected application program, shading an unselected application program, or displaying an indicator (not shown) on the screen displaying the selected application program.

After the application program to perform the function corresponding to the remote signal is selected, when the user presses the button 124 of the stylus pen 120 or touches a certain area of the stylus pen 120 as shown in view (e) of FIG. 6, the electronic device 100 may receive a second remote signal generated from the stylus pen 120 through the wireless communication module 1392. When the second remote signal is received, the electronic device 100 may perform a function corresponding to the second remote signal with respect to the selected application program. For example, the electronic device 100 may perform the function of the application program related to the second GUI 612 displayed on the screen. That is, the electronic device 100 may play the content by using the media application program 601.

In this case, the electronic device 100 may control the touch screen display structure 101 to display a third GUI 613 indicating a function corresponding to an additional remote signal with respect to the selected application program, as shown in view (0 of FIG. 6. In view (f) of FIG. 6, the third GUI 613 may be a pause icon indicating that a function of pausing play of the content can be performed as the function corresponding to the additional remote signal.

The user may control the media application program 601 and the Internet search application program 602 altogether by using the stylus pen 120. For example, the user may press the button 124 of the stylus pen 120 or may touch a certain area (for example, a touch pad area) of the stylus pen 120. In this case, the electronic device 100 may receive a remote signal generated by the press or touch on the button 124 of the stylus pen 120, and may control the media application program 601 to perform a function corresponding to the remote signal. On the other hand, the user may drag the user interface included in the Internet search application program 602 by using the stylus pen 120. In this case, the electronic device 100 may detect a touch signal according to the drag of the stylus pen 120, and may scroll a web page displayed on the screen in one direction by using the Internet search application program 602 in response to the drag signal.

Figure 7:
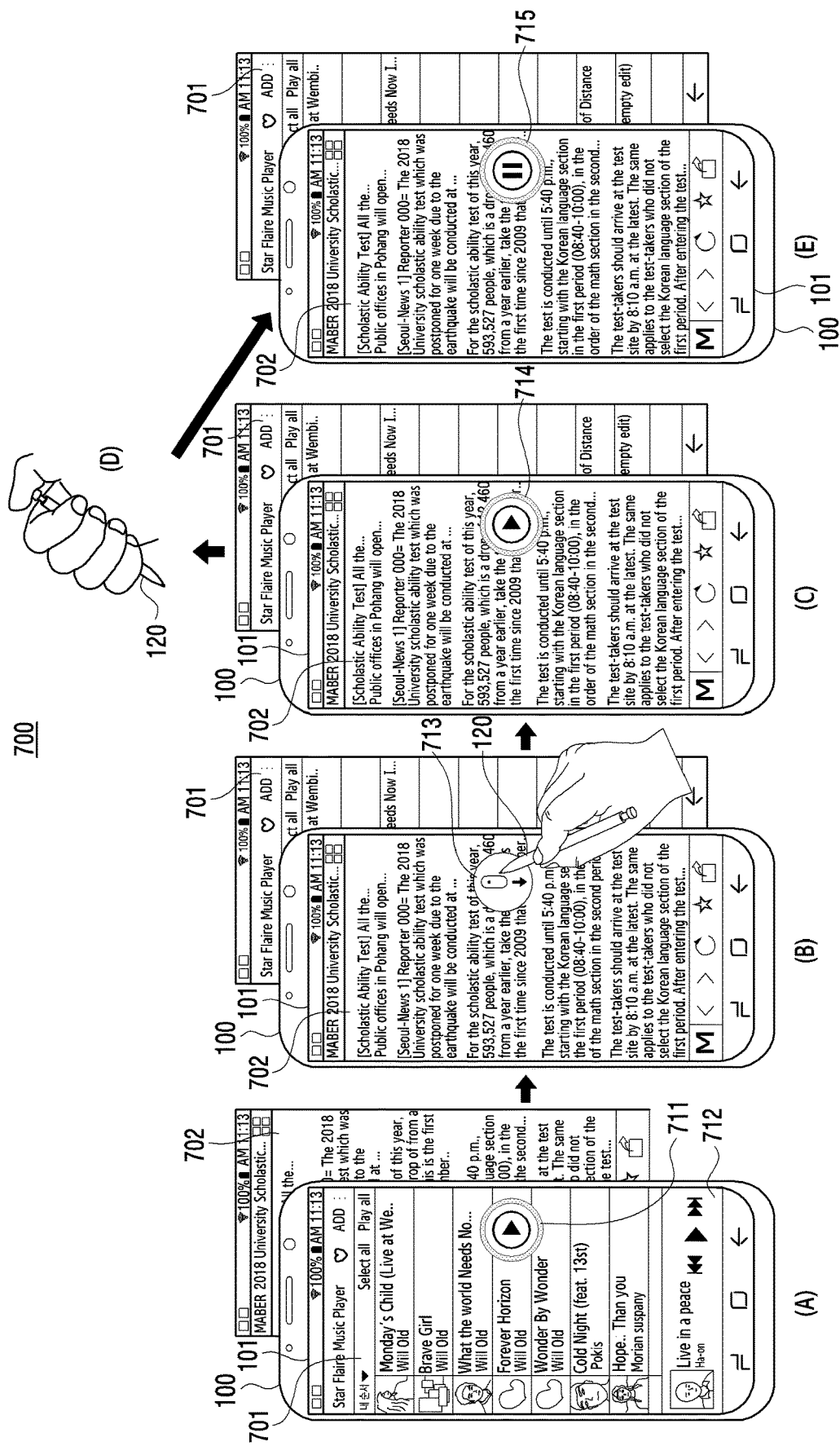

FIG. 7 illustrate views 700 explaining the electronic device 100 performing functions according to another embodiment of the present disclosure.

In view (a) of FIG. 7, the processor 1320 of the electronic device 100 may execute a first application program 701 and a second application program 702. In view (a) of FIG. 7, the first application program 701 may be a media application program 701 running in the foreground, and the second application program 702 may be an Internet search application program 702 running in the background. The processor 1320 of the electronic device 100 may control the touch screen display structure 101 to display a first user interface included in the first application program 701 running in the foreground. In this case, the processor of the electronic device 100 may already select the media application program 701 as the application program to execute a function corresponding to a remote signal received from the stylus pen 120. The electronic device 100 may control the touch screen display structure 101 to display a first GUI 711 indicating the function corresponding to the remote signal. In view (a) of FIG. 7, the first GUI 711 may be a GUI indicating that a function of playing a content can be performed as the function corresponding to the remote signal. The user may play the content through a control window 712 included in the media application program 701. That is, the media application program 701 may play the content based on a remote signal generated at the stylus pen 120, or may play the content based on a touch signal generated according to a touch on the control window 712 by the stylus pen 120.

In this condition, the user may switch the application program being displayed on the screen. For example, the user may select an application program to be executed in the foreground by executing a background application program selection menu. In FIG. 7, it is assumed that the Internet search application program 702 is selected as the application program to be executed in the foreground according to selection of the user. In this case, the media application program 701 may be executed in the background. In this case, the electronic device 100 may also switch the application program to perform a function corresponding to a remote signal. The electronic device 100 may switch the application program to perform a function corresponding to a remote signal to the Internet search application program 702.

Accordingly, as shown in view (b) of FIG. 7, the electronic device 100 may control the touch screen display structure 101 to display a second user interface included in the Internet search application program 702 on the screen. In addition, the electronic device 100 may control the touch screen display structure 101 to display a second GUI 713 indicating the function corresponding to the remote signal with respect to the Internet search application program 702. In this case, the second GUI 713 may be a GUI indicating that a function of scrolling a web page can be performed as the function corresponding to the remote signal. That is, the GUI displayed on the screen while the Internet search application program 702 is running in the foreground and the media application program 701 is running in the background may be a GUI indicating that the function corresponding to the remote signal can be performed with respect to the Internet search application program 702.

In view (b) of FIG. 7, the user may want to control the media application program 701 which is running in the background while viewing the web page. To achieve this, the user may do a long press on the second GUI 713 in view (b) of FIG. 7. Accordingly, the electronic device 100 may switch the application program to execute the function corresponding to the remote signal to another application program. For example, the electronic device 100 may select an application program to perform the function corresponding to the remote signal from at least one application program running in the background, by considering priority. When there are a plurality of application programs running in the background, the electronic device 100 may select the application program to perform the function corresponding to the remote signal, by considering a recent running time of the application program, user preference, popularity of the application program.

If the media application program 701 is selected as the application program to perform the function corresponding to the remote signal, the electronic device 100 may control the touch screen display structure 101 to display a third GUI 714 indicating the function corresponding to the remote signal with respect to the selected application program, as shown in view (c) of FIG. 7. In view (c) of FIG. 7, the third GUI 714 may be a play icon indicating that a function of playing a content can be performed as the function corresponding to the remote signal. That is, the GUI displayed on the screen while the Internet search application program 702 is running in the foreground and the media application program 701 is running in the background may be a GUI indicating that the function corresponding to the remote signal can be performed with respect to the media application program 701.

Next, when the user presses the button 124 of the stylus pen 120 or touches a certain area of the stylus pen 120 as shown in view (d) of FIG. 7, the electronic device 100 may receive a remote signal generated from the stylus pen from the stylus pen 120.

When the remote signal is received, the electronic device 100 may perform the function corresponding to the remote signal with respect to the selected application program. For example, the electronic device 100 may perform the function of the application program related to the third GUI 714 which is being displayed on the screen. That is, the electronic device 100 may play the content by using the media application program 701.

In this case, as shown in view (e) of FIG. 7, the electronic device 100 may control the touch screen display structure 101 to display a fourth GUI 715 indicating a function corresponding to an additional remote signal with respect to the selected application program. In view (e) of FIG. 7, the fourth GUI 715 may be a pause icon indicating that a function of pausing play of the content can be performed as the function corresponding to the additional remote signal.

Figure 8:
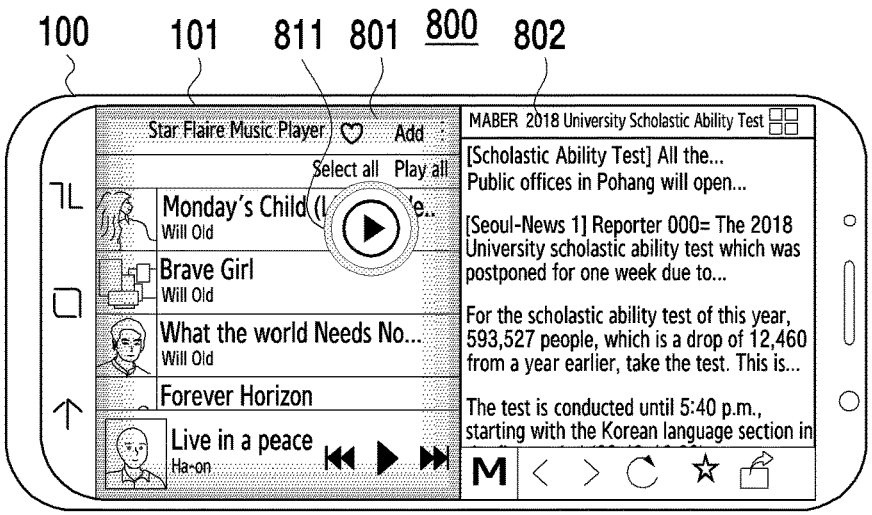
Figure 8:
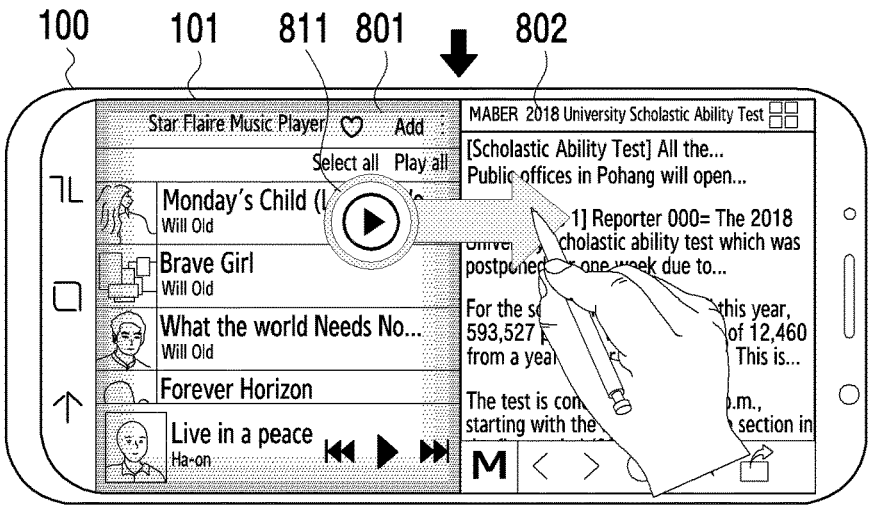
Figure 8:
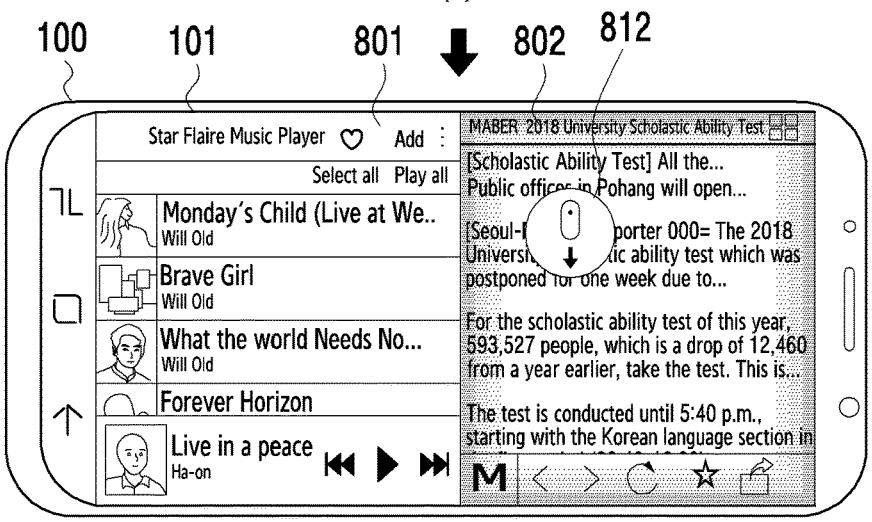

FIG. 8 illustrates views 800 explaining the electronic device 100 performing functions according to another embodiment of the present disclosure.

In view (a) of FIG. 8, the electronic device 100 may execute a multi window function, and may control the touch screen display structure 101 to display a first user interface included in a first application program 801 and a second user interface included in a second application program 802 in respective windows. In this case, a GUI indicating a function corresponding to a remote signal may be positioned in an enabled window by default. If the first user interface included in a media application program 801 is being displayed in the enabled window, the processor 1320 of the electronic device 100 may control the touch screen display structure 101 to display a first GUI 811 indicating that a function of playing a content can be performed as the function corresponding to the remote signal in the enabled window.

In this case, when the user presses the button 124 of the stylus pen 120 or touches a certain area of the stylus pen 120, the electronic device 100 may perform the function corresponding to the remote signal generated from the stylus 120 with respect to the application program including the user interface in the enabled window. For example, when the remote signal is received, the electronic device 100 may play the content by using the media application program 801 including the first user interface in the enabled window.

In this condition, the user may want to switch (or change, select) the application program to perform the function corresponding to the remote signal. For example, as shown in view (b) of FIG. 8, the user may move the first GUI 811 to a window displaying the user interface of an application program that the user wants to control remotely, by dragging the first GUI 811 indicating the function corresponding to the remote signal. Accordingly, the electronic device 100 may select the window to which the first GUI 811 is moved as the enabled window, and may select the application program providing the user interface in the window to which the first GUI 811 is moved, as the application program to execute the function corresponding to the remote signal. In view (b) of FIG. 8, the Internet search application program 802 may be selected as the application program to perform the function corresponding to the remote signal. In this case, as shown in view (c) of FIG. 8, the electronic device 100 may display a second GUI 812 indicating the function corresponding to the remote signal on the screen with respect to the selected application program. For example, the electronic device 100 may display the second GUI 812 indicating that a web page can be scrolled as a function of the Internet search application program 802 providing the second user interface 802 in the enabled window.

In this case, when the user presses the button 124 of the stylus pen 120 or touches a certain area of the stylus pen 120, the electronic device 100 may perform a function corresponding to the remote signal generated from the stylus pen 120 with respect to the application program displayed in the enabled window. For example, the electronic device 100 may scroll a web page included in the selected Internet search application program 802 in one direction.

In various embodiments, the enabled window in view (c) of FIG. 8 may be a window in which the media application program 801 is displayed. In this case, the electronic device 100 may control the Internet search application program 802 remotely by pressing the button 124 of the stylus pen 120 or touching a certain area of the stylus pen 120, while controlling a content included in the media application program 801 based on a touch by a finger or a touch by the stylus pen 120.

Figure 9:
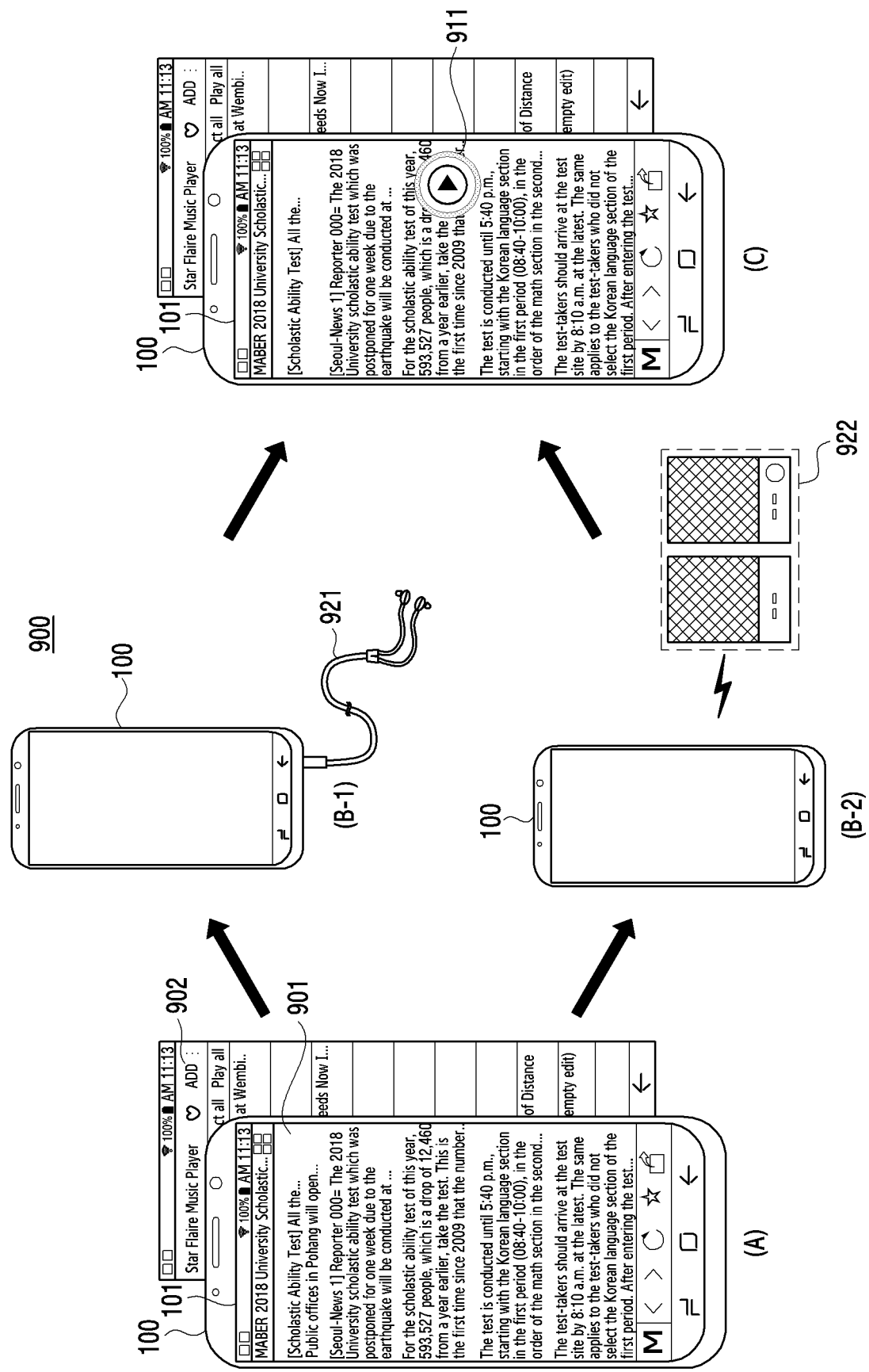

FIG. 9 illustrates views 900 explaining the electronic device 100 performing functions according to another embodiment of the present disclosure.

In view (a) of FIG. 9, the processor 1320 of the electronic device 100 may execute a first application program 901 and a second application program 902. In this case, one of the first application program 901 or the second application program 902 may be a media application program. For example, the first application program 901 may be an Internet search application program 901 running in the foreground, and the second application program 902 may be a media application program 902 running in the background.

In this case, the electronic device 100 may be connected with an audio output device which outputs a content included in the media application program 902. For example, as shown in view (b-1) of FIG. 9, the electronic device 100 may be connected with an ear phone 921. Alternatively, as shown in view (b-2) of FIG. 9, the electronic device 100 may be connected with at least one speaker 922 through a wireless (or wired) network.

When a connection is detected, the electronic device 100 may automatically select the media application program associated with the audio output device as an application program to be remotely controlled by the stylus pen 120. In addition, as shown in view (c) of FIG. 9, the electronic device 100 may control the touch screen display structure 101 to display a GUI 911 indicating a function corresponding to a remote signal of the stylus pen 120 with respect to the automatically selected media application program 902. The GUI 911 may include, for example, a content play icon indicating that a function of outputting a content through the connected ear phone or speaker can be executed when the user presses the button 124 of the stylus pen 120 or touches a certain area of the stylus pen 120.

In various embodiments, the processor 1320 of the electronic device 100 may be executing the media application program. In this case, the media application program may be running in the foreground or background.

In this case, when a predetermined time elapses or in response to a user input (for example, a user input of pressing a power button (not shown) on one side of the electronic device 100), the processor 1320 of the electronic device 100 may control the touch screen display structure 101 to display a lock screen. When the lock screen is in an always on display (AOD) state, the processor 1320 of the electronic device 100 may control the touch screen display structure 101 to display a GUI related to the media application program on the lock screen. In this case, the electronic device 100 may select (or match) the application program displaying the GUI on the lock screen, as the application program to perform the remote control function of the stylus pen 120.

In this condition, when a remote signal is received from the stylus pen 120 as the user presses the button 124 of the stylus pen 120 or touches a certain area of the stylus pen 120, the electronic device 100 may perform a function related to the remote signal with respect to the selected application program. For example, the electronic device 100 may play a content which is in queue, pause a playing content, end the playing content, play a previous or next content, or control a volume of the content.

In various embodiments, the electronic device 100 may be communication-connected (or mirroring-connected) with a display device through a network. In this case, the electronic device 100 may select (or match) an application program for controlling play of a content of the display device as the application program to perform the remote control function.

The selected application program may be, for example, a mirroring application program or a remote control application program for controlling the display device.

In this condition, when a remote signal is received from the stylus pen 120 as the user presses the button 124 of the stylus pen 120 or touches a certain area of the stylus pen 120, the electronic device 100 may perform a function related to the remote signal with respect to the selected application program. For example, the electronic device 100 may play a content which is in queue, pause a playing content, end the playing content, play a previous or next content, control a play speed of the content, control a subtitle related to the content, control a volume of the content, or control a display state of the content.

Figure 10:
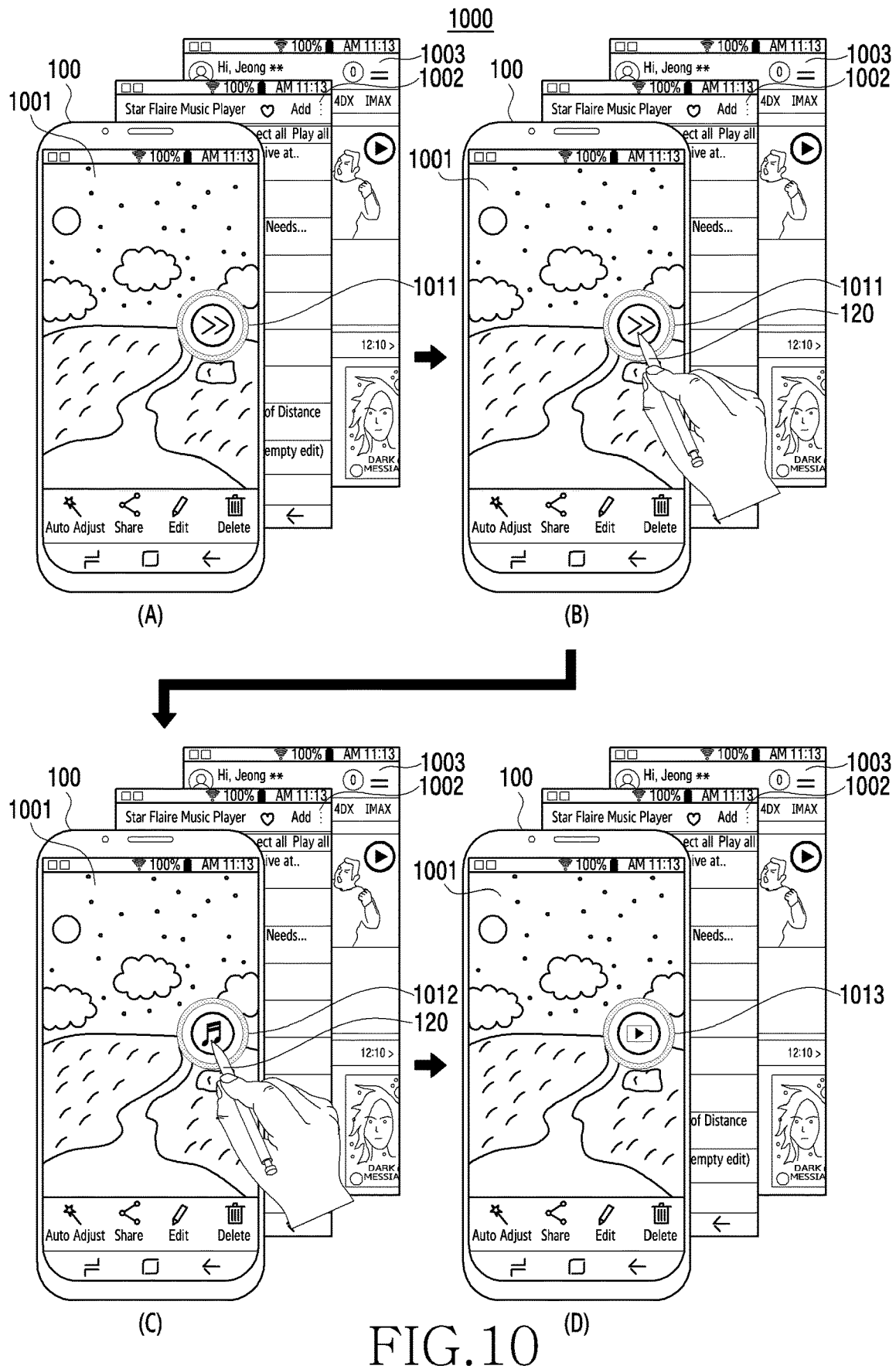

FIG. 10 illustrates views 1000 explaining the electronic device 100 performing functions according to another embodiment of the present disclosure.

In view (a) of FIG. 10, the processor 1320 of the electronic device 100 may be executing a plurality of application programs. In this case, a user interface included in a first application program 1001 may be being displayed in the foreground, and a second application program 1002 and a third application program 1003 may be running in the background. For example, the first application program 1001 including the user interface may be a gallery application program 100, the second application program 1002 may be a media application program 1002, and the third application program 1003 may be a media app application program 1003 (for example, the YouTube application program).

In this case, the electronic device 100 may already select the first application program 1001 as an application program to perform a function corresponding to a remote signal of the stylus pen 120. Accordingly, the electronic device 100 may control the touch screen display structure 101 to display a first GUI 1011 indicating the function corresponding to the remote signal of the stylus pen 120 with respect to the gallery application program 1001. The first GUI 1011 may include an icon indicating that a function of displaying a previous or next image can be performed.

In this condition, as shown in view (b) of FIG. 10, the user may do a long press on the first GUI 1011 by using the stylus pen 120. When a touch signal corresponding to the long press is received, the electronic device 100 may select an application program positioned at the very front (or a most recently executed application program) from among the background application programs as the application program to perform the function corresponding to the remote signal.

If the selected application program is the media application program 1002 which is the second application program 1002, the electronic device 100 may control the touch screen display structure 101 to display a second GUI 1012 indicating the function corresponding to the remote signal with respect to the media application program 1002, as shown in view (c) of FIG. 10.

In view (c) of FIG. 10, the user may do a long press on the second GUI 1012 by using the stylus pen 120. When a touch signal corresponding to the long press on the second GUI 1012 is received, the electronic device 100 may select the next application program from among the background application programs as the application program to perform the function corresponding to the remote signal. If the selected application program is the media app application program 1003 which is the third application program 1003, the electronic device 100 may control the touch screen display structure 101 to display a third GUI 1013 indicating the function corresponding to the remote signal with respect to the media app application program 1003. The third GUI 1013 may be, for example, an icon for playing a content included in the media app application program 1003, pausing the playing content, ending the playing content, playing a previous or next content. In this case, when a remote signal is received as the user presses the button 120 of the stylus pen 120 or touches a certain area of the stylus pen 120, the electronic device 100 may perform the function related to the remote signal with respect to the selected media app application program 1003.

Figure 11A:
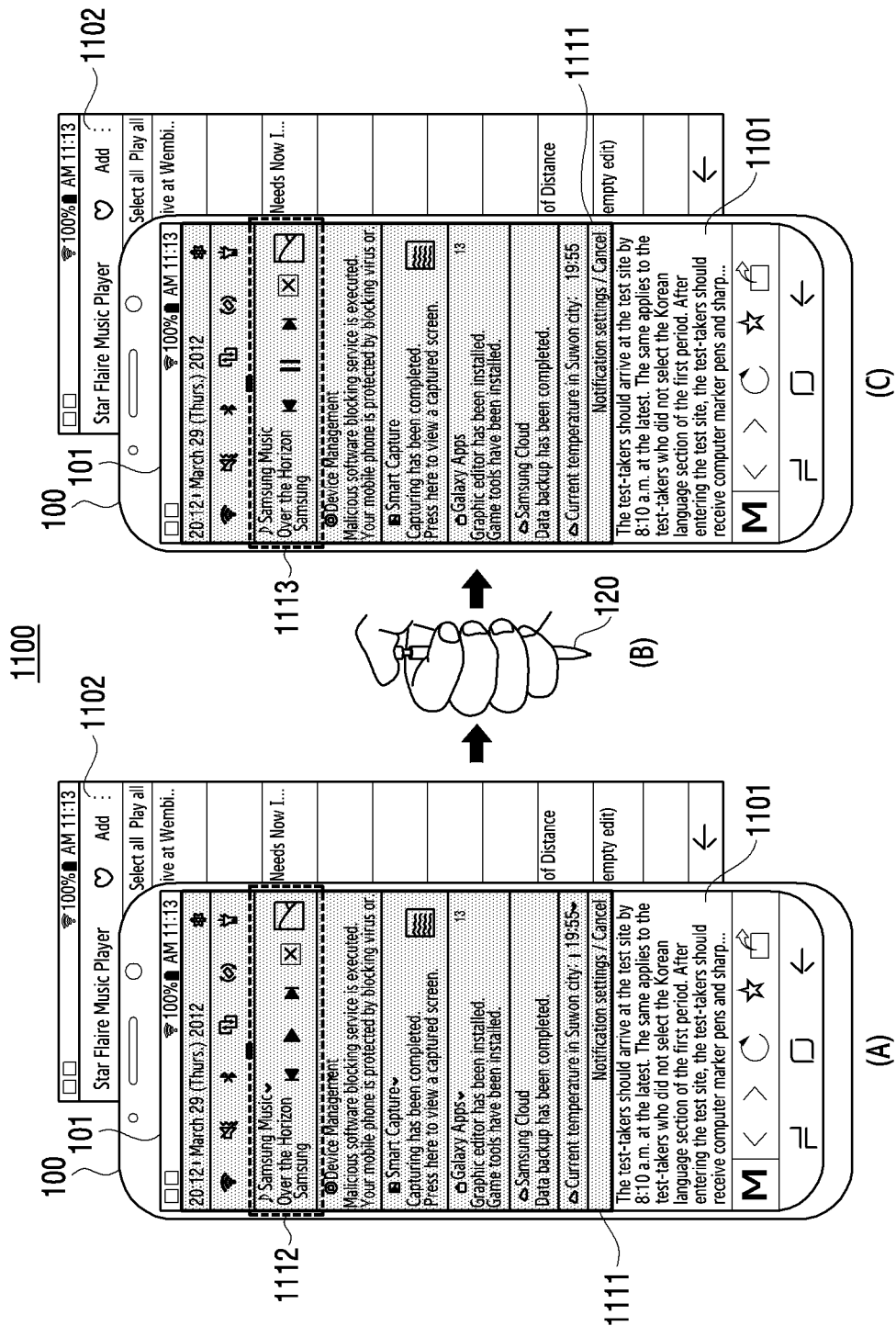
Figure 11B:
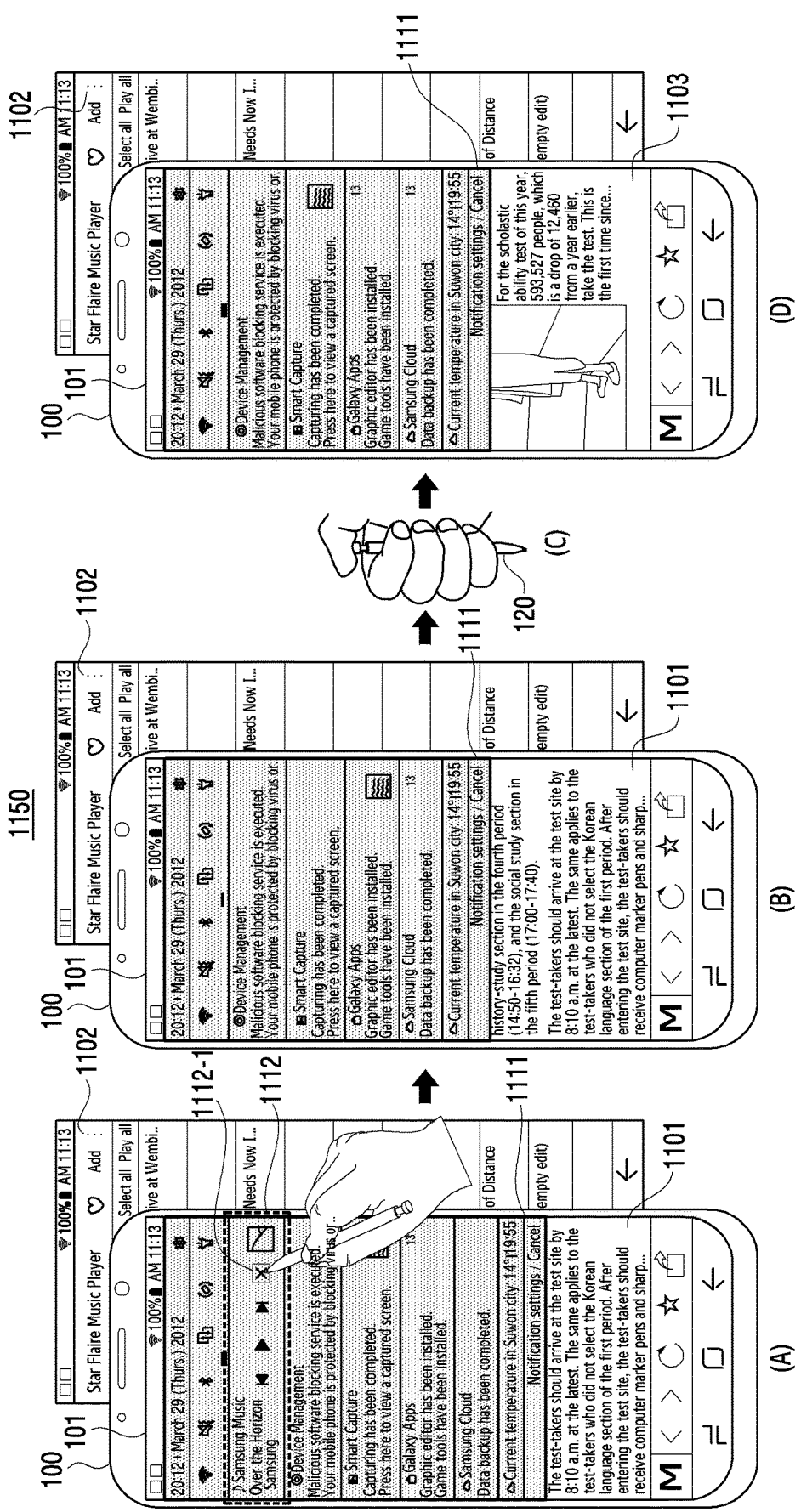

FIGS. 11A and 11B are views 1100, 1150 explaining the electronic device 100 performing functions according to another embodiment of the present disclosure.

In FIG. 11A, the processor 1320 of the electronic device 100 may be executing a first application program 1101 and a second application program 1102. In this case, the electronic device 100 may select an application program corresponding to a controller 1112 displayed on a quick panel 1111 as an application program to perform a remote control function by the stylus pen 120.

For example, the controller (for example, a control UI or a control GUI) 1112 for controlling a content provided by the media application program 1102 supporting the remote control function may exist on the quick panel 1111. For example, when the media application program 1102 is running or has a record of having been executed, the controller 1112 for controlling a content may exist on the quick panel 1111. The quick panel 1111 may be displayed on the screen by dragging in one direction from one side of the electronic device 100 as shown in view (a) of FIG. 11A.

If the controller 1112 included in the application program supporting the remote control function exists on the quick panel 1111, the electronic device 100 may control the application program 1102 providing the controller 1112 according to a remote signal received from the stylus pen 120. For example, as shown in view (b) of FIG. 11A, the user may press the button 124 of the stylus pen 120 communication-paired with the electronic device 100, or may touch a certain area (for example, a touch pad area) of the stylus pen 120. In this case, when a remote signal generated by the press or touch on the button 124 of the stylus pen 120 is received, the electronic device 100 may execute a function of the media application program 1102 providing the controller 1112. For example, the electronic device 100 may play or pause a content included in the media application program 1102 running in the background.

In addition, the quick panel 1111 including the controller 1112 with an execution state of the content being changed may be displayed on the screen as shown in view (c) of FIG. 11A.

In another example, as shown in view (a) of FIG. 11B, the controller 1112 for controlling a content included in the media application program 1102 supporting the remote control function may exist on the quick panel 1111. In this case, the user may delete the controller 1112 from the quick panel 1111. For example, when the user touches a delete icon 1112-1 of the quick panel 1111 by the stylus pen 120 or finger, the controller 1112 may be deleted from the quick panel 1111. In addition, as shown in view (b) of FIG. 11B, the quick panel 1111 from which the controller 1112 is deleted may be displayed on the touch screen display structure 101.

In this condition, as shown in view (c) of FIG. 11B, the user may press the button 124 of the stylus pen 120 communication-paired with the electronic device 100, or may touch a certain area (for example, a touch pad area) of the stylus pen 120. Accordingly, when a remote signal generated by the press or touch on the button 124 of the stylus pen 120 is received, the electronic device 100 may perform a function corresponding to the remote signal with respect to the application program running in the foreground. For example, if the application program running in the foreground is an Internet search application program 1101, the electronic device 100 may control the touch screen display structure 101 to display another second web page 1103 by scrolling a first web page 1101 included in the Internet search application program 1101 in one direction, as shown in view (d) of FIG. 11B.

In various embodiments, functions of an application program according to remote signals of the stylus pen 120 may be arranged as shown in tables presented below, by considering presence/absence of the controller 1112 on the quick panel 1111.

Tables 1 and 2 illustrate an example of executing a function by using an application program in the background in preference to other programs, according to a remote signal of the stylus pen 120. In addition, tables 3 and 4 illustrate an example of executing a function by using an application program in the foreground in preference to other programs, according to a remote signal of the stylus pen 120.

application program. For example, the quick launcher function may be a function of executing a content of a list bookmarked by the user or a function of executing a content recommended by the media application program or an acquaintance of the user.

That is, referring to table 1, if the controller 1112 of the media application program exists on the quick panel 1111, when a remote signal is received from the stylus pen 120, the electronic device 100 may perform the function of the media application program running in the background in preference to other programs, irrespective of the application program running in the foreground. For example, the electronic device 100 may perform the function of the media application program running in the background in preference to other programs, irrespective of whether the application program running in the foreground is controllable by a remote control signal. In this case, the electronic device 100 performing the function irrespective of the application running in the foreground may include not checking a type, a state or a supported function of the application program running in the foreground, or disregarding a result of checking even if they are checked.

TABLE 1

| | | State | |
|---|---|---|---|
| | | Background A media application is running (A controller exists on the quick panel). | |
| | | Foreground | |
| Operation | | Remotely controllable application | Remotely uncontrollable application |
| Remote signal of the stylus pen | Single press Double press Long press | A media control function is performed. A quick launcher function is performed. | |

TABLE 2

| | | State | |
|---|---|---|---|
| | | Background A media application is running (A controller does not exist on the quick panel). | |
| | | Foreground | |
| Operation | | Remotely controllable application | Remotely uncontrollable application |
| Remote signal of the stylus pen | Single press Double press | A pre-defined function is performed. | No function is performed. |
| | Long press | A quick launcher function is performed. | |

Table 1 illustrates a state in which a media application program is running in the background and the controller 1112 of the media application program exists on the quick panel 1111. In this case, when a remote signal is received from the stylus pen 120, the electronic device 100 may perform a media control function. In this case, different remote signals may be received according to whether the user does a single press or a double press on the button 124 of the stylus pen 120. The electronic device 100 may perform different media control functions according to respective signals. For example, when a remote signal caused by the single press is received, the electronic device 100 may play or pause a content running in the media application program. In addition, when a remote signal caused by the double press is received, the electronic device 100 may play a next content provided by the media application program. In addition, when the user does a long press on the stylus pen 120, a corresponding remote signal may be received. In this case, the electronic device 100 may perform the quick launcher function corresponding to the long press. The quick launcher function may be a function that is separately defined by the user or a function that is defined by default in the electronic device 100. The function defined by default may be, for example, a screen capturing function, a recording function, a shooting function, etc., but is not limited thereto. Alternatively, the quick launcher function may be a function that is related to the running media Table 2 illustrates a state in which a media application program is running in the background, and the controller 1112 of the media application program does not exist on the quick panel 1111. In this case, when a remote signal is received from the stylus pen 120, the electronic device 100 may select an application program that is remotely controllable in the foreground. In addition, the electronic device 100 may perform a pre-defined function with respect to the selected application program. In this case, different remote signals may be received according to whether the user does a single press or a double press on the button 124 of the stylus pen 120. The electronic device 100 may perform pre-defined different functions according to respective signals. For example, if the application program remotely controllable in the foreground is an Internet search application program, when a remote signal caused by the single press is received, the electronic device 100 may drag up (or down) a web page. In addition, when a remote signal caused by the double press is received, the electronic device 100 may drag down (or up) the web page. In addition, when the user does a long press through the stylus pen 120, a corresponding remote signal may be received. In this case, the electronic device 100 may perform the quick launcher function corresponding to the long press.

When there does not exist the application program remotely controllable in the foreground, the electronic device 100 may not perform a separate function.

TABLE 3

| | | State | |
|---|---|---|---|
| | | Background A media application is running (A controller exists on the quick panel). | |
| | | Foreground | |
| Operation | | Remotely controllable application | Remotely uncontrollable application |
| Remote signal of the stylus pen | Single press Double press | A pre-defined function is performed. | A media control function is performed. |
| | Long press | A quick launcher function is performed. | |

Table 3 illustrates a state in which a media application program is running in the background and the controller 1112 of the media application program exists on the quick panel 1111. In this case, when a remote signal is received from the stylus pen 120, the electronic device 100 may perform a remote control function by using an application program running in the foreground in preference to other programs. For example, when there exists an application program supporting a remote signal in the foreground, the electronic device 100 may perform a pre-defined function according to a remote signal. In this case, different remote signals may be received according to whether the user does a single press or a double press on the button 124 of the stylus pen 120. The electronic device 100 may perform pre-defined different functions according to respective signals. In addition, when the user does a long press on the stylus pen 120, a corresponding remote signal may be received. In this case, the electronic device 100 may perform the quick launcher function corresponding to the long press.

When there does not exist the application program remotely controllable in the foreground, the electronic device 100 may perform a remote control function corresponding to a remote signal with respect to the media application program running in the background.

TABLE 4

| | | State | |
|---|---|---|---|
| | | Background A media application is running. (A controller does not exist on the quick panel). | |
| | | Foreground | |
| Operation | | Remotely controllable application | Remotely uncontrollable application |
| Remote signal of the stylus pen | Single press Double press | A pre-defined function is performed. | No function is performed. |
| | Long press | A quick launcher function is performed. | |

Table 4 illustrates a state in which a media application program is running in the background, and the controller 1112 of the media application program does not exist on the quick panel 1111. In this case, when a remote signal is received from the stylus pen 120, the electronic device 100 may perform a remote control function by using an application program running in the foreground in preference to other programs. For example, when there exists an application program supporting a remote signal in the foreground, the electronic device 100 may perform a pre-defined function according to the remote signal. In this case, different remote signals may be received according to whether the user does a single press or a double press on the button 124 of the stylus pen 120. The electronic device 100 may perform pre-defined different functions according to respective signals. In addition, when the user does a long press on the stylus pen 120, a corresponding remote signal may be received. In this case, the electronic device 100 may perform the quick launcher function corresponding to the long press.

On the other hand, when there does not exist the application program remotely controllable in the foreground, the electronic device 100 may not perform a separate function.

Figure 12:
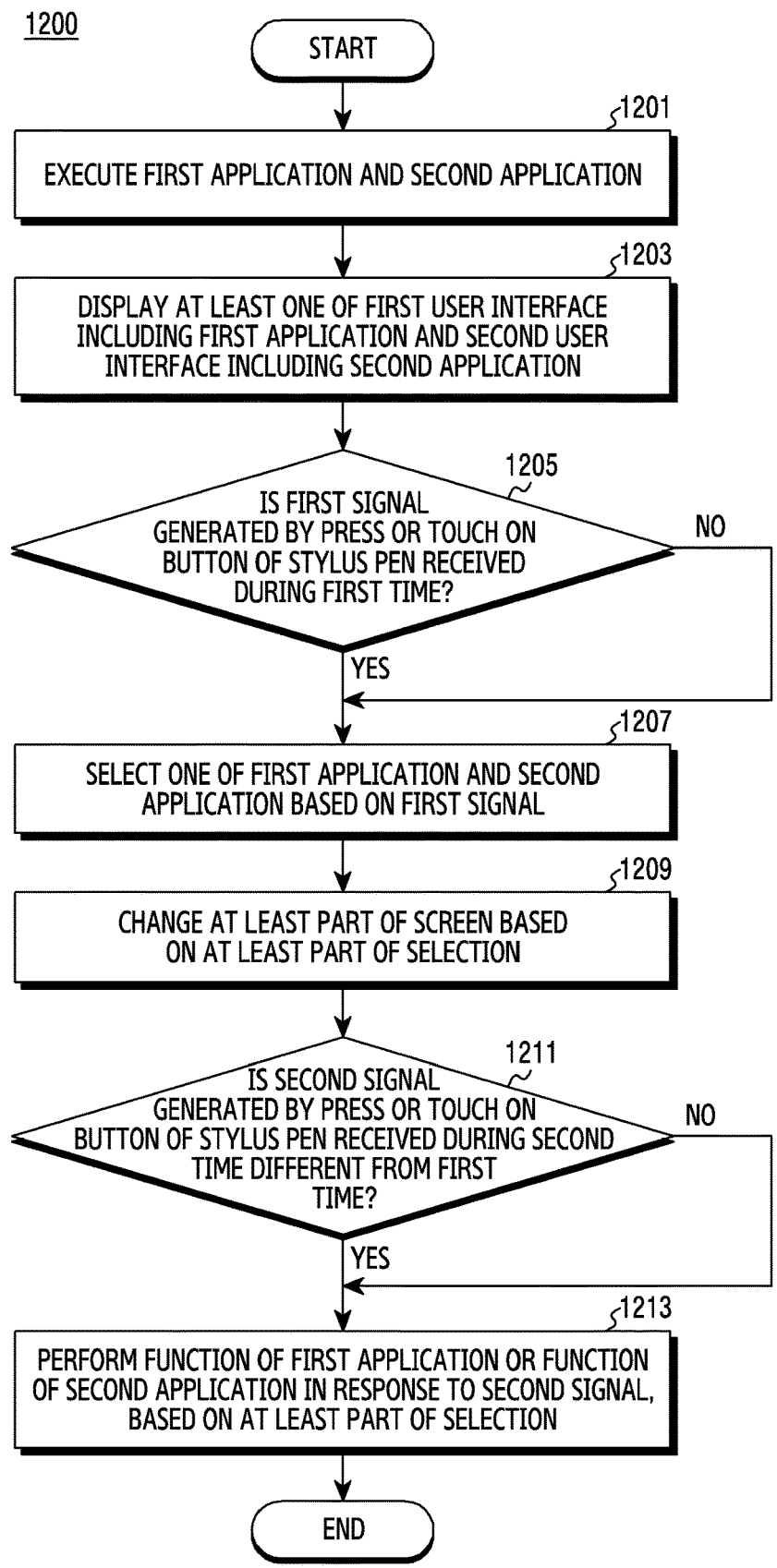
FIG. 12 is a flowchart of an electronic device performing functions according to various embodiments of the present disclosure.

FIG. 12 is a flowchart 1200 for performing a function by the electronic device 100 according to various embodiments of the present disclosure.

In FIG. 12, the electronic device 100 may execute a first application program and a second application program (1201).

The electronic device 100 may display at least one of a first user interface including the first application program and a second user interface including the second application program (1203). For example, the electronic device 100 may display only one of the first user interface or the second user interface. Alternatively, the electronic device 100 may display both the first user interface and the second user interface on the screen.

In this condition, the electronic device 100 may determine whether a first signal generated by a press on a touch on the button of the stylus pen 120 is received during a first time (1205). The first signal may be a signal that is generated by the press or touch on the button 124 of the stylus pen 120 communication-paired with the electronic device 100 by using a Bluetooth protocol. In this case, the Bluetooth protocol may include a BLE protocol.

When the first signal is received (1205-Y), the electronic device 100 may select one of the first application program or the second application program based on the first signal (1207). The electronic device may change at least a part of the screen, based on at least a part of the selection (1209). For example, the electronic device 100 may display a GUI indicating a function of the first application program or a function of the second application program on the screen. The GUI may include, for example, a play icon related to playing of a content included in a media application program, a stop icon related to stopping of the play of the content, or an end icon related to ending of the play of the content. Alternatively, the electronic device 100 may highlight the selected application program or may display the selected application program on the foreground screen, based on at least a part of the selection.

In addition, the electronic device 100 may determine whether a second signal generated by a press or a touch on the button 124 of the stylus pen 120 is received during a second time which is different from the first time (1211). The second signal may be a signal that is generated by a press or a touch on the button 124 of the stylus pen 120 communication-paired with the electronic device 100 by using a Bluetooth protocol. In this case, the Bluetooth protocol may include a BLE protocol.

When the second signal is received (1211-Y), the electronic device 100 may perform the function of the first application program or the function of the second application program in response to the second signal, based on at least a part of the selection of operation 1207 (1213). For example, the electronic device 100 may perform the function of the application program selected in response to the first signal in operation 1207 (1213).

In various embodiments, the electronic device 100 may receive a third signal generated by a touch input or a hovering input on the screen by use of the stylus pen 120. In addition, the electronic device 100 may perform the function of the first application program or the function of the second application program in response to the third signal. In this case, the first signal and the second signal may be remote signals, and the third signal may be a touch signal.

Figure 13:
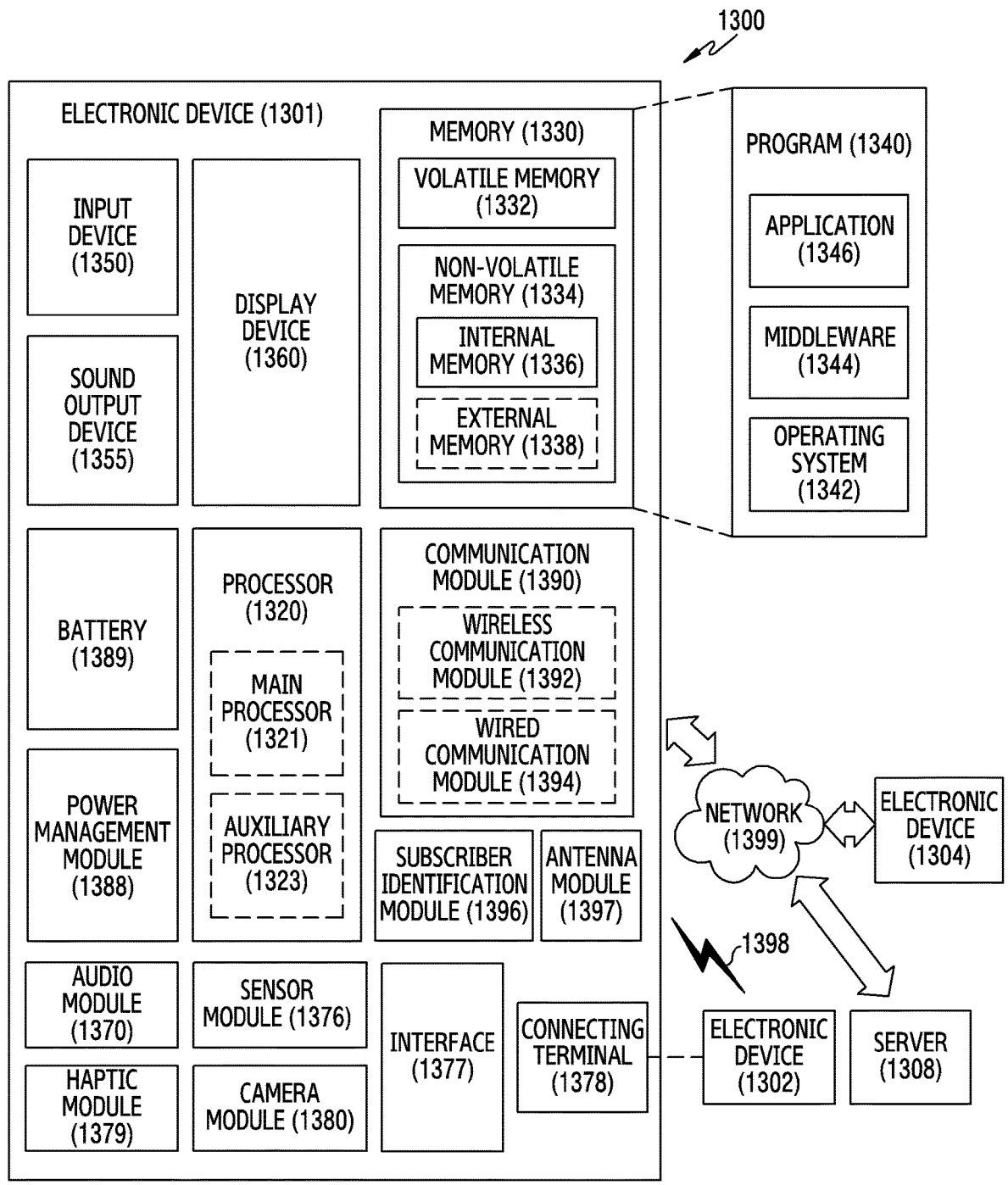
FIG. 13 is a block diagram of an electronic device in a network environment according to various embodiments of the present disclosure.

FIG. 13 is a block diagram illustrating an electronic device 1301 in a network environment 1300 according to various embodiments. The electronic device 1301 may include the electronic device 100 of FIG. 1. Referring to FIG. 13, the electronic device 1301 in the network environment 1300 may communicate with an electronic device 1302 via a first network 1398 (e.g., a short-range wireless communication network), or an electronic device 1304 or a server 1308 via a second network 1399 (e.g., a long-range wireless communication network). According to an embodiment, the electronic device 1301 may communicate with the electronic device 1304 via the server 1308. According to an embodiment, the electronic device 1301 may include a processor 1320, memory 1330, an input device 1350, a sound output device 1355, a display device 1360, an audio module 1370, a sensor module 1376, an interface 1377, a haptic module 1379, a camera module 1380, a power management module 1388, a battery 1389, a communication module 1390, a subscriber identification module (SIM) 1396, or an antenna module 1397. In some embodiments, at least one (e.g., the display device 1360 or the camera module 1380) of the components may be omitted from the electronic device 1301, or one or more other components may be added in the electronic device 1301. In some embodiments, some of the components may be implemented as single integrated circuitry. For example, the sensor module 1376 (e.g., a fingerprint sensor, an iris sensor, or an illuminance sensor) may be implemented as embedded in the display device 1360 (e.g., a display).

The processor 1320 may execute, for example, software (e.g., a program 1340) to control at least one other component (e.g., a hardware or software component) of the electronic device 1301 coupled with the processor 1320, and may perform various data processing or computation. According to one embodiment, as at least part of the data processing or computation, the processor 1320 may load a command or data received from another component (e.g., the sensor module 1376 or the communication module 1390) in volatile memory 1332, process the command or the data stored in the volatile memory 1332, and store resulting data in non-volatile memory 1334. According to an embodiment, the processor 1320 may include a main processor 1321 (e.g., a central processing unit (CPU) or an application processor (AP)), and an auxiliary processor 1323 (e.g., a graphics processing unit (GPU), an image signal processor (ISP), a sensor hub processor, or a communication processor (CP)) that is operable independently from, or in conjunction with, the main processor 1321. Additionally or alternatively, the auxiliary processor 1323 may be adapted to consume less power than the main processor 1321, or to be specific to a specified function. The auxiliary processor 1323 may be implemented as separate from, or as part of the main processor 1321.

The auxiliary processor 1323 may control at least some of functions or states related to at least one component (e.g., the display device 1360, the sensor module 1376, or the communication module 1390) among the components of the electronic device 1301, instead of the main processor 1321 while the main processor 1321 is in an inactive (e.g., sleep) state, or together with the main processor 1321 while the main processor 1321 is in an active state (e.g., executing an application). According to an embodiment, the auxiliary processor 1323 (e.g., an image signal processor or a communication processor) may be implemented as part of another component (e.g., the camera module 1380 or the communication module 1390) functionally related to the auxiliary processor 1323.

The memory 1330 may store various data used by at least one component (e.g., the processor 1320 or the sensor module 1376) of the electronic device 1301. The various data may include, for example, software (e.g., the program 1340) and input data or output data for a command related thereto. The memory 1330 may include the volatile memory 1332 or the non-volatile memory 1334.

The program 1340 may be stored in the memory 1330 as software, and may include, for example, an operating system (OS) 1342, middleware 1344, or an application 1346.

The input device 1350 may receive a command or data to be used by other component (e.g., the processor 1320) of the electronic device 1301, from the outside (e.g., a user) of the electronic device 1301. The input device 1350 may include, for example, a microphone, a mouse, or a keyboard.

The sound output device 1355 may output sound signals to the outside of the electronic device 1301. The sound output device 1355 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 1360 may visually provide information to the outside (e.g., a user) of the electronic device 1301. The display device 1360 may include, for example, a display, a hologram device, or a projector and control circuitry to control a corresponding one of the display, hologram device, and projector. According to an embodiment, the display device 1360 may include touch circuitry adapted to detect a touch, or sensor circuitry (e.g., a pressure sensor) adapted to measure the intensity of force incurred by the touch.

The audio module 1370 may convert a sound into an electrical signal and vice versa. According to an embodiment, the audio module 1370 may obtain the sound via the input device 1350, or output the sound via the sound output device 1355 or a headphone of an external electronic device (e.g., an electronic device 1302) directly (e.g., wiredly) or wirelessly coupled with the electronic device 1301.

The sensor module 1376 may detect an operational state (e.g., power or temperature) of the electronic device 1301 or an environmental state (e.g., a state of a user) external to the electronic device 1301, and then generate an electrical signal or data value corresponding to the detected state. According to an embodiment, the sensor module 1376 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1377 may support one or more specified protocols to be used for the electronic device 1301 to be coupled with the external electronic device (e.g., the electronic device 1302) directly (e.g., wiredly) or wirelessly. According to an embodiment, the interface 1377 may include, for example, a high definition multimedia interface (HDMI), a universal serial bus (USB) interface, a secure digital (SD) card interface, or an audio interface.

A connecting terminal 1378 may include a connector via which the electronic device 1301 may be physically connected with the external electronic device (e.g., the electronic device 1302). According to an embodiment, the connecting terminal 1378 may include, for example, a HDMI connector, a USB connector, a SD card connector, or an audio connector (e.g., a headphone connector), The haptic module 1379 may convert an electrical signal into a mechanical stimulus (e.g., a vibration or a movement) or electrical stimulus which may be recognized by a user via his tactile sensation or kinesthetic sensation. According to an embodiment, the haptic module 1379 may include, for example, a motor, a piezoelectric element, or an electric stimulator.

The camera module 1380 may capture a still image or moving images. According to an embodiment, the camera module 1380 may include one or more lenses, image sensors, image signal processors, or flashes.

The power management module 1388 may manage power supplied to the electronic device 1301. According to one embodiment, the power management module 1388 may be implemented as at least part of, for example, a power management integrated circuit (PMIC).

The battery 1389 may supply power to at least one component of the electronic device 1301. According to an embodiment, the battery 1389 may include, for example, a primary cell which is not rechargeable, a secondary cell which is rechargeable, or a fuel cell.

The communication module 1390 may support establishing a direct (e.g., wired) communication channel or a wireless communication channel between the electronic device 1301 and the external electronic device (e.g., the electronic device 1302, the electronic device 1304, or the server 1308) and performing communication via the established communication channel. The communication module 1390 may include one or more communication processors that are operable independently from the processor 1320 (e.g., the application processor (AP)) and supports a direct (e.g., wired) communication or a wireless communication. According to an embodiment, the communication module 1390 may include a wireless communication module 1392 (e.g., a cellular communication module, a short-range wireless communication module, or a global navigation satellite system (GNSS) communication module) or a wired communication module 1394 (e.g., a local area network (LAN) communication module or a power line communication (PLC) module). A corresponding one of these communication modules may communicate with the external electronic device via the first network 1398 (e.g., a short-range communication network, such as Bluetooth™, wireless-fidelity (Wi-Fi) direct, or infrared data association (IrDA)) or the second network 1399 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1392 may identify and authenticate the electronic device 1301 in a communication network, such as the first network 1398 or the second network 1399, using subscriber information (e.g., international mobile subscriber identity (IMSI)) stored in the subscriber identification module 1396.

The antenna module 1397 may transmit or receive a signal or power to or from the outside (e.g., the external electronic device) of the electronic device 1301. According to an embodiment, the antenna module 1397 may include one or more antennas, and, therefrom, at least one antenna appropriate for a communication scheme used in the communication network, such as the first network 1398 or the second network 1399, may be selected, for example, by the communication module 1390. The signal or the power may then be transmitted or received between the communication module 1390 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1301 and the external electronic device 1304 via the server 1308 coupled with the second network 1399. Each of the electronic devices 1302 and 1304 may be a device of a same type as, or a different type, from the electronic device 1301. According to an embodiment, all or some of operations to be executed at the electronic device 1301 may be executed at one or more of the external electronic devices 1302, 1304, or 1308. For example, if the electronic device 1301 should perform a function or a service automatically, or in response to a request from a user or another device, the electronic device 1301, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1301. The electronic device 1301 may provide the outcome, with or without further processing of the outcome, as at least part of a reply to the request. To that end, a cloud computing, distributed computing, or client-server computing technology may be used, for example.

Figure 14:
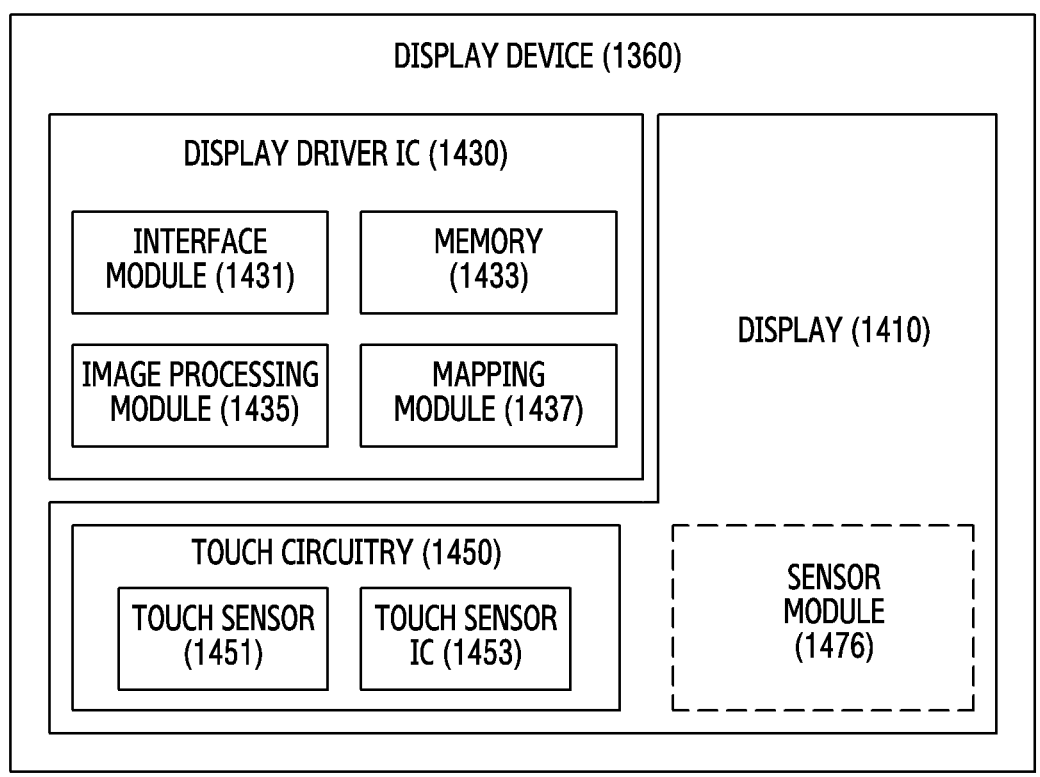
FIG. 14 is a block diagram of a display device according to various embodiments of the present disclosure.

FIG. 14 is a block diagram 1400 illustrating the display device 1360 according to various embodiments. Referring to FIG. 14, the display device 1360 may include a display 1410 and a display driver integrated circuit (DDI) 1430 to control the display 1410. The DDI 1430 may include an interface module 1431, memory 1433 (e.g., buffer memory), an image processing module 1435, or a mapping module 1437. The DDI 1430 may receive image information that contains image data or an image control signal corresponding to a command to control the image data from another component of the electronic device 1301 via the interface module 1431. For example, according to an embodiment, the image information may be received from the processor 1320 (e.g., the main processor 1321 (e.g., an application processor)) or the auxiliary processor 1323 (e.g., a graphics processing unit) operated independently from the function of the main processor 1321. The DDI 1430 may communicate, for example, with touch circuitry 1350 or the sensor module 1376 via the interface module 1431. The DDI 1430 may also store at least part of the received image information in the memory 1433, for example, on a frame by frame basis. The image processing module 1435, for example, may perform pre-processing or post-processing (e.g., adjustment of resolution, brightness, or size) with respect to at least part of the image data, based at least in part on one or more characteristics of the image data or one or more characteristics of the display

1410. The mapping module 1437 may generate a voltage value or a current value corresponding to the image data pre-processed or post-processed by the image processing module 1435. According to an embodiment, the generating of the voltage value or current value may be performed, for example, based at least in part on one or more attributes of the pixels (e.g., an array, such as an RGB stripe or a pentile structure, of the pixels, or the size of each subpixel). At least some pixels of the display 1410 may be driven, for example, based at least in part on the voltage value or the current value such that visual information (e.g., a text, an image, or an icon) corresponding to the image data may be displayed via the display 1410.

According to an embodiment, the display device 1360 may further include the touch circuitry 1450. The touch circuitry 1450 may include a touch sensor 1451 and a touch sensor IC 1453 to control the touch sensor 1451. The touch sensor IC 1453 may control the touch sensor 1451 to sense a touch input or a hovering input with respect to a certain position on the display 1410. For example, the touch sensor IC 1453 may detect a touch input or a hovering input by measuring a change in a signal (e.g., voltage, amount of light, resistance, or amount of charge) for a specific location of the display 1410. The touch sensor IC 1453 may provide information (e.g., location, area, pressure, or time) on the sensed touch input or hovering input to the processor 1320. According to an embodiment, at least part (e.g., the touch sensor IC 1453) of the touch circuitry 1450 may be formed as part of the display 1410 or the DDI 1430, or as part of another component (e.g., the auxiliary processor 1323) disposed outside the display device 1360.

According to an embodiment, the display device 1360 may further include at least one sensor (e.g., a fingerprint sensor, an iris sensor, a pressure sensor, or an illuminance sensor) of the sensor module 1376 or a control circuit for the at least one sensor. In such a case, the at least one sensor or the control circuit for the at least one sensor may be embedded in one portion of a component (e.g., the display 1410, the DDI 1430, or the touch circuitry 1350)) of the display device 1360. For example, when the sensor module 1376 embedded in the display device 1360 includes a biometric sensor (e.g., a fingerprint sensor), the biometric sensor may obtain biometric information (e.g., a fingerprint image) corresponding to a touch input received via a portion of the display 1410. As another example, when the sensor module 1376 embedded in the display device 1360 includes a pressure sensor, the pressure sensor may obtain pressure information corresponding to a touch input received via a partial or whole area of the display 1410. According to an embodiment, the touch sensor 1451 or the sensor module 1376 may be disposed between pixels in a pixel layer of the display 1410, or over or under the pixel layer.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 1340) including one or more instructions that are stored in a storage medium (e.g., internal memory 1336 or external memory 1338) that is readable by a machine (e.g., the electronic device 1301). For example, a processor (e.g., the processor 1320) of the machine (e.g., the electronic device 1301) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The invention claimed is:
1. An electronic device comprising:
 a housing comprising a first surface facing in a first direction and a second surface facing in a second direction opposite to the first direction;
 a touch screen display structure positioned in the housing and comprising a screen seen through the first surface;
 a first wireless communication circuit positioned in the housing and configured to support a Bluetooth protocol;
 a stylus pen comprising a second wireless communication circuit configured to support the Bluetooth protocol and to be paired with the first wireless communication circuit, the stylus pen comprising at least one button which is pressable or touchable;

a processor positioned in the housing and operatively connected with the touch screen display structure and the first wireless communication circuit; and a memory positioned in the housing and operatively connected with the processor, wherein the memory stores a first application program comprising a first user interface and a second application program comprising a second user interface, wherein the memory further stores instructions that are configured to cause, when being executed, the processor to:

execute the first application program and the second application program;

display at least one of the first user interface or the second user interface on the screen; and while executing the first application program and the second application program:

receive a first signal generated by a press or a touch on the button from the stylus pen during a first time;

select an application program set to support a function mapped onto the first signal as an application program to be controlled with the stylus pen from among the first application program being executed and the second application program being executed, based on the first signal;

display a GUI indicating the function that can be performed by the first signal, based on the selection;

receive a second signal generated by a press or a touch on the button from the stylus pen during a second time which is different from the first time while the GUI is being displayed; and perform a function of the application program that is selected based on the first signal among the first application program and the second application program, in response to receiving the second signal while the GUI is being displayed.

2. The electronic device of claim 1, wherein the Bluetooth protocol comprises a BLE protocol.

3. The electronic device of claim 1, wherein the instructions are configured to cause the processor to display only one of the first user interface or the second user interface on the screen.

4. The electronic device of claim 1, wherein the instructions are configured to cause the processor to display both the first user interface and the second user interface on the screen.

5. The electronic device of claim 1, wherein the GUI comprises a play icon related to playing of a content included in a media application program, a stop icon related to stopping of the play of the content, or an end icon related to ending of the play of the content.

6. The electronic device of claim 1, wherein the instructions are configured to cause the processor to highlight the selected application program or to display the selected application program on a foreground screen.

7. The electronic device of claim 1, wherein the touch screen display structure further comprises a touch circuit configured to sense a touch input or a hovering input on the screen, wherein the instructions are configured to cause the processor to receive a third signal generated by the touch input or the hovering input on the screen by use of the stylus pen through the touch circuit, and to perform a function of the application program that is selected based on the first signal in response to the third signal, and wherein the first signal and the second signal received through the first wireless communication circuit are remote signals, and the third signal received through the touch circuit is a touch signal.

8. A method for performing a function of an electronic device, the method comprising:

executing a first application program and a second application program;

displaying at least one of a first user interface comprising the first application program or a second user interface comprising the second application program on a screen; and while executing the first application program and the second application program:

receiving a first signal generated by a press or a touch on a button of a stylus pen communication-paired with the electronic device by use of a Bluetooth protocol, from the stylus pen during a first time;

selecting an application program set to support a function mapped onto the first signal as an application program to be controlled with the stylus pen from among the first application program being executed and the second application program being executed, based on the first signal;

displaying a GUI indicating the function that can be performed by the first signal, based on the selection;

receiving a second signal generated by a press or a touch on the button from the stylus pen during a second time which is different from the first time while the GUI is being displayed; and performing a function of the application program that is selected based on the first signal among the first application program and the second application program, in response to receiving the second signal while the GUI is being displayed.

9. The method of claim 8, wherein the Bluetooth protocol comprises a BLE protocol.

10. The method of claim 8, wherein displaying at least one of the first user interface and the second user interface comprises displaying only one of the first user interface or the second user interface.

11. The method of claim 8, wherein displaying at least one of the first user interface and the second user interface comprises displaying both the first user interface and the second user interface on the screen.

12. The method of claim 8, wherein the GUI comprises a play icon related to playing of a content included in a media application program, a stop icon related to stopping of the play of the content, or an end icon related to ending of the play of the content.

13. The method of claim 8, wherein changing at least a part of the screen based on at least a part of the selection comprises highlighting the selected application program or displaying the selected application program on a foreground screen.

14. The method of claim 8, further comprising:

receiving a third signal generated by a touch input or a hovering input on the screen by use of the stylus pen; and performing a function of the application program that is selected based on the first signal in response to the third signal, wherein the first signal and the second signal are remote signals, and the third signal is a touch signal.

15. A computer program product comprising a non-transitory computer readable recording medium which stores, in a computer, instructions for executing the operations of:

executing a first application program and a second application program;

displaying at least one of a first user interface comprising the first application program or a second user interface comprising the second application program on a screen; and while executing the first application program and the second application program:

receiving a first signal generated by a press or a touch on a button of a stylus pen communication-paired with an electronic device by use of a Bluetooth protocol, from the stylus pen during a first time;

selecting an application program set to support a function mapped onto the first signal as an application program to be controlled with the stylus pen from among the first application program being executed and the second application program being executed, based on the first signal;

displaying a GUI indicating the function that can be performed by the first signal, based on the selection;

receiving a second signal generated by a press or a touch on the button from the stylus pen during a second time which is different from the first time while the GUI is being displayed; and performing a function of the application program that is selected based on the first signal among the first application program and the second application program, in response to receiving based on the second signal while the GUI is being displayed.

\* \* \* \* \*